United States Patent [19]

Takehara et al.

[11] Patent Number: 4,828,754

[45] Date of Patent: May 9, 1989

[54] NOVEL LIQUID CRYSTALLINE COMPOUNDS HAVING SUBSTITUENTS

[75] Inventors: Sadao Takehara, Yono; Toru Fujisawa, Kawaguchi; Yoshi Arai, Hasuda; Jitsuo Kurokawa, Ohmiya, all of Japan

[73] Assignees: Dainippon Ink & Chemicals, Inc., Tokyo; Kawamura Institute of Chemical Res., Saitama, both of Japan

[21] Appl. No.: 161,421

[22] Filed: Feb. 23, 1988

Related U.S. Application Data

[63] Continuation of Ser. No. 815,935, Jan. 3, 1986, abandoned.

[30] Foreign Application Priority Data

| Jan. 9, 1985 [JP] | Japan | 60-1791 |
| Apr. 4, 1985 [JP] | Japan | 60-71628 |
| Apr. 17, 1985 [JP] | Japan | 60-81688 |
| Apr. 26, 1985 [JP] | Japan | 60-90676 |

[51] Int. Cl.⁴ .............. C09K 19/12; C09K 19/20; G02F 1/13; C07C 69/76
[52] U.S. Cl. .............. 252/299.65; 252/299.67; 252/299.01; 350/350 S; 560/59; 560/65; 560/66; 560/73; 560/102; 560/108; 560/109; 560/20; 560/21; 560/23
[58] Field of Search .............. 252/299.65, 299.67, 252/299.01; 350/350 S; 560/59, 65, 66, 73, 102, 108, 109

[56] References Cited

U.S. PATENT DOCUMENTS

| Re. 31,715 | 10/1984 | Coates et al. | 350/346 |
| 4,176,918 | 12/1979 | Labes | 350/346 |
| 4,216,109 | 11/1978 | Mizukuchi | 252/299.65 |
| 4,542,230 | 9/1985 | Gray et al. | 252/299.67 |
| 4,576,732 | 3/1986 | Isogai et al. | 252/299.65 |
| 4,596,667 | 6/1986 | Inukai et al. | 252/299.65 |
| 4,613,209 | 9/1986 | Goodby et al. | 350/350 S |
| 4,622,165 | 11/1986 | Kano et al. | 252/299.65 |
| 4,728,458 | 3/1988 | Higuchi et al. | 252/299.65 |
| 4,737,313 | 4/1988 | Saito et al. | 252/299.65 |
| 4,753,752 | 6/1988 | Raynes et al. | 252/299.65 |

FOREIGN PATENT DOCUMENTS

| 174816 | 2/1985 | European Pat. Off. | 252/299.65 |
| 191600 | 8/1986 | European Pat. Off. | 252/299.65 |
| 2939782 | 4/1981 | Fed. Rep. of Germany | 252/299.65 |
| 59-55579 | 5/1974 | Japan | 252/299.67 |
| 61-122250 | 6/1986 | Japan | 252/299.65 |
| 61-210056 | 9/1986 | Japan | 252/299.65 |
| 62-111950 | 5/1987 | Japan | 252/299.65 |

OTHER PUBLICATIONS

Gray et al., Mol. Cryst. Liq. Cryst., vol. 67, pp. 1-24, 1981.
Coates, D., "The Effect of Lateral Substitution on Smectic C Formation", Liquid Crystals, vol. 2, No. 4, 1987, pp. 423-428.
Molecular Crystals and Liquid Crystals, vol. 110, 1984, pp. 175-203, J. W. Goodby et al., "Ferroelectric Liquid Crystals-Structure and Design".

*Primary Examiner*—Teddy S. Gron
*Assistant Examiner*—J. E. Thomas
*Attorney, Agent, or Firm*—Sherman and Shalloway

[57] ABSTRACT

A liquid crystalline compound represented by formula

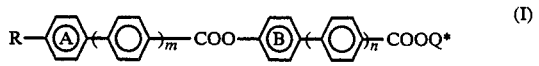

(I)

wherein
R denotes an alkyl or alkoxy group having 1 to 20 carbon atoms,
m and n are each 0 or 1, provided m and n are not 1 at the same time.

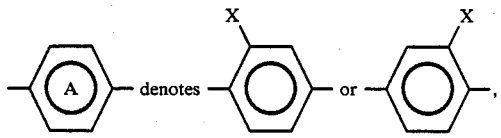

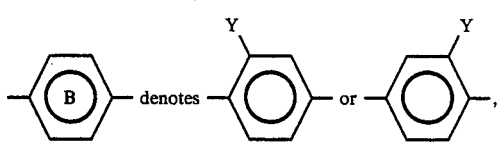

X and Y each denote a hydrogen atom, a halogen atom or a nitro group, provided X and Y are not hydrogen atoms at the same time, and Q* denotes an optically active group having an asymmetric carbon atom and a linear or cyclic alkyl or alkenyl group which may be substituted by a halogen atom, or the like.

21 Claims, No Drawings

NOVEL LIQUID CRYSTALLINE COMPOUNDS HAVING SUBSTITUENTS

This application is a continuation of application, Ser. No. 815,935 filed Jan. 3, 1986, now abandoned.

This invention relates to a liquid crystalline compound and a liquid crystalline composition. More specifically, this invention relates to a liquid crystalline compound and a liquid crystalline composition useful as a ferroelectric liquid crystalline material, to be concrete, a liquid crystalline material available as a liquid crystalline display element that allows excellent response and excellent memory in particular as compared to the conventional liquid crystalline materials.

Liquid crystalline display elements possess various superior characteristics. Namely, said display elements are operable at low voltage with a small amount of power consumed, enable thin display, and are of light receiving type making it possible to use them in light places without imposing burden on eyes. Accordingly, said display elements have now found widespread use. The most common display mode is currently a twisted nematic (TN) mode. The TN display mode uses a nematic liquid crystal which has all of the aforesaid characteristics but is quite slow in speed of response compared to other light emission type display modes including CRT. Moreover, when an applied electric field is broken, it returns to the original state and a display memory (memory effect) therefore cannot be obtained. For the above reasons, much restriction is imposed on application of the TN display mode to a light shutter, a printer head and a TV screen.

Other than the TN mode, a guest-host (GH) mode, an electrically controlled birefringence (ECB) mode, a phase change (PC) mode and a thermoelectric mode have been studied and developed as liquid crystalline display elements, having individually unique characteristics. However, with respect to response, they are not said to have been improved in particular compared to the TN mode. On the other hand, a dual-sequence address field mode and a super TN mode have been developed as liquid crystal display modes allowing high-speed response, and they have been fairly improved in response, but are not said to be satisfactory enough. In addition, in the dual-sequence address field mode, the operating circuit is too complicated and in the super TN mode the screen turns yellow which is not suitable for color display. Development of liquid crystal display modes having better response has been further attempted.

Ferroelectric liquid crystals to meet this purpose have been lately reported [R. Mayer et al., J. Physique, 36, L69 (1975)]. It is pointed out that the display elements making use of the ferroelectric liquid crystals allow response at high speed of 100 to 1000 times the speed of the conventional liquid crystal display elements and have a memory effect provided by bistability [N. A. Clark, S. T. Lagerwall, Appl. Phys. Lett., 36, 899 (1980)]. Said display elements are expected to be applied to many display elements in various fields such as a TV screen, a high-speed light shutter, a printer head, computer terminals, and the like.

The ferroelectric liquid crystals are those having a tilt-type chiral smectic phase as a liquid crystalline phase. Practically preferable of these is a chiral smectic C (hereinafter abbreviated as "$S_C^*$") phase having the lowest viscosity. Liquid crystalline compounds having the $S_C^*$ phase have been so far studied and many such compounds have been already known.

Typical examples are Shiff's base liquid crystals of (s)-2-methylbutyl p-decyloxybenzylidene aminocinnamate (abbreviated as "DOBAMBC") and its analogues. DOBAMBC is now one of the most frequently used liquid crystalline compounds for studying properties and alignment of ferroelectric liquid crystals and is one standard of important properties in ferroelectric liquid crystals, such as a helical pitch value of spontaneous polarization, etc. However, DOBAMBC and compounds of its series are not satisfactory from the practical aspect because they have drawbacks that ① light stability is lacking, ② stability to water is lacking, ③ liquid crystalline compounds per se are colored, and ④ the temperature range in which the above compounds enantiotropically show the $S_C^*$ phase is narrow, within 20° C. and far from a room temperature range [(1) P. Keller et al., J. De Physique, 37, C3 (1976): (2) idem, Acad. Sc. Paris, 282, C639 (1976): (3) B. I. Ostrouskii et al., Ferroelectrics, 24, 309 (1980): (4) K. Yoshino et al., Japanese J. of Appl. Physics, 23, L175 (1984): and (5) Isogai et al., Japanese Laid-open Patent Application No. 59-98051].

Some azoxy liquid crystals have been known, but they are practically improper owing to the strong coloration [P. Keller et al., Am. Phys. 3 139 (1978)]. To remedy such defect, chemically stable ester-type liquid crystalline compounds have been recently studied and many reports have been already given.

Reviews introducing a great deal of these compounds are (1) J. W. Goodby et al., Liquid Crystals and Ordered Fluids, vol. 4, pp. 1-32, (2) J. W. Goodby, T. M. Leslie, Mol. Cryst. Liq. Cryst., 110, 175 (1984). M. Isogai et al., EP No. 0110299 is a literature involving many such compounds.

However, out of the ester compounds introduced in the above references, a bicyclic compound having 2 benzene rings in a molecule is, as shown in (i) or (ii) below, monotropic such that the $S_C^*$ phase appears only when the temperature decreases, and the transition temperature to the $S_C^*$ phase is by far lower than the melting point. Said compound therefore tends to crystallize and is not said to be practical. A tricyclic compound has, as shown in (iii) or (iv) below, the melting point by far higher than the room temperature range though the temperature range of the $S_C^*$ phase is wide. Accordingly, the temperature range of these compounds has to be adjusted by mixing many of them and it is not easy to obtain such compositions.

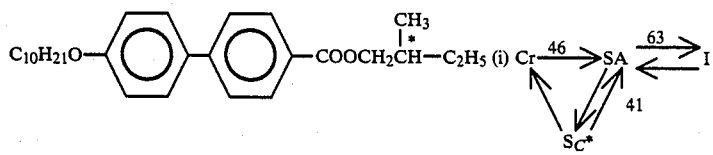

-continued

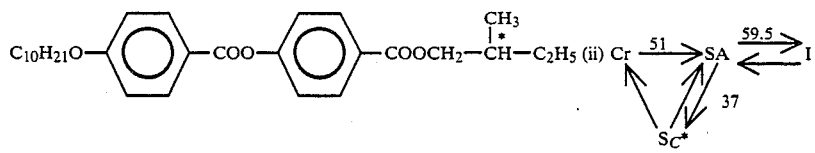

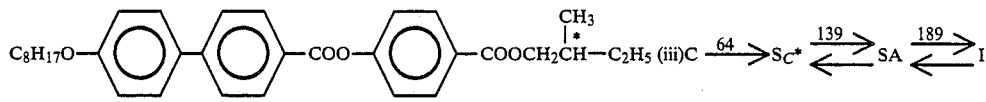

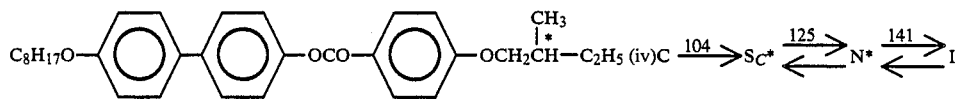

An object of this invention is to provide novel liquid crystalline compounds which singly or in admixture take a liquid phase having ferroelectricity near room temperature, above all, a chiral smectic C phase in a wide temperature range.

Another object of this invention is to provide liquid crystal display elements with high-speed response using such novel liquid crystalline compounds or liquid crystalline compositions.

A liquid crystalline compound in this invention is an ester compound [hereinafter called a "compound (I)"] represented by formula

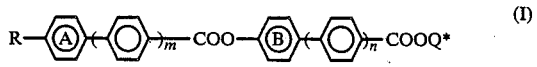

wherein

R denotes an alkyl or alkoxy group having 1 to 20 carbon atoms, m and n are each 0 or 1, provided m and n are not 1 at the same time,

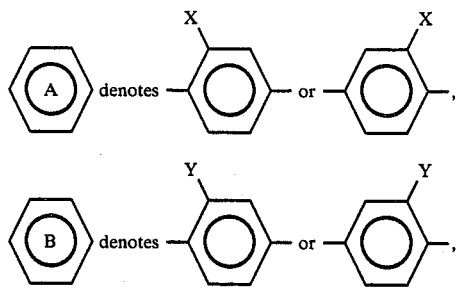

X and Y each denote a hydrogen atom, a halogen atom or a nitro group, provided X and Y are not hydrogen atoms at the same time, and Q* denotes an optically active group having an asymmetric carbon atom and a linear or cyclic alkyl or alkenyl group which may be substituted by a halogen atom, or the like.

What this invention calls the liquid crystalline composition is a liquid crystalline composition composed of a plurality of the compounds (I) or a liquid crystalline composition composed of one or more of the compounds (I) and one or more of liquid crystalline compounds other than the compounds (I).

As noted earlier, the ferroelectricity in liquid crystals occurs when the liquid crystals take a tilt-type chiral smectic phase, more concretely, a chiral smectic C ($S_C*$) phase, a chiral smectic F ($S_F*$) phase, a chiral smectic G ($S_G*$) phase, a chiral smectic H ($S_H*$) phase, a chiral smectic I ($S_I*$) phase, a chiral smectic J ($S_J*$) phase or a chiral smectic K ($S_K*$) phase. The most practical of these is the $S_C*$ phase. Though a switching action is observed in some other phases, these phases are similar to the crystalline phase with a high viscosity, impractically low in speed of response.

Most of the compounds (I) have the $S_C*$ phase; some are in the wide temperature range or in the room temperature range. Some of the compounds (I) take only a $S_A$ phase or a chiral nematic (hereinafter abbreviated as "N*") phase but do not take the $S_C*$ phase, or some are extremely free from the liquid crystalline phase. These can be used for decreasing the melting point and enlarging the lower temperature range by mixing them with other compounds taking the $S_C*$ phase. The compounds are, whether having or not having the $S_C*$ phase, available as chiral additives used to prevent a reverse domain in the conventional TN liquid crystals. On this occassion, it is especially preferable that R is a lower alkyl or alkoxy group.

In formula (I), R is an alkyl or alkoxy group having 1 to 20 carbon atoms. Generally, a compound having the alkoxy group tends to take the $S_C*$ phase, but a compound having the alkyl group of course takes the $S_C*$ phase in many cases. On contrasting the alkyl group with the alkoxy group, the compound with R of the alkyl group shows a lower transition temperature as shown below.

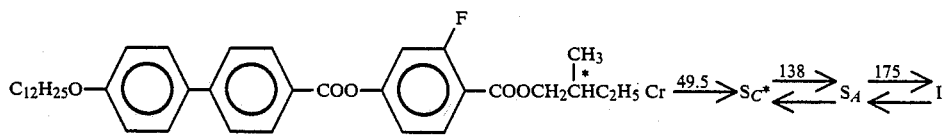

-continued

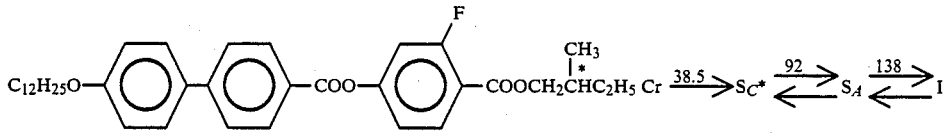

As the optically active group Q*, a (S)-2-methylbutyl group derived from (S)-2-methylbutanol obtained as a main component of a natural fusel oil is most frequently utilized. Also available are a (S)-2-methylpentyl group, a (S)-4-methylhexyl group, a (S)-5-methylheptyl group and a (S)-6-methyloctyl group derived from the (S)-2-methylbutanol. As will be later described, to provide great spontaneous polarization, it is advisable that an intermolecular permanent dipole and an asymmetric carbon are close to each other. To this end, a 1-methylpropyl group, 1-methylheptyl group and 2-chloropropyl group derived from optically active 2-butanol, 2-octanol and 2-chloropropanol are used. Menthol and borneol, citronerol, natural terpene compounds may be used as optically active sources.

When in formula (I) m and n are 0, at the same time, the compounds (I) is bicyclic. When m is 1 and n is 0 or m is 0 and n is 1, the compound (I) is tricyclic. In case of the bicyclic compound, the temperature generally becomes low near room temperature, but that temperature range is narrow. In case of the tricyclic compound, the temperature range tends to be wide and high.

As is apparent from formula (I), the compounds (I) are grouped into those having the following three liquid crystalline structures depending on values of m and n.

1  m = 0 n = 0 (type A)

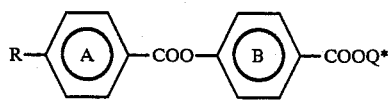

2  m = 0 n = 1 (type B)

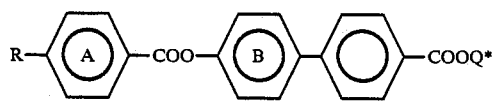

3  m = 1 n = 1 (type C)

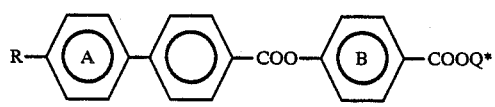

In the above formulas, as described earlier,

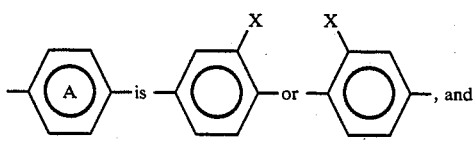

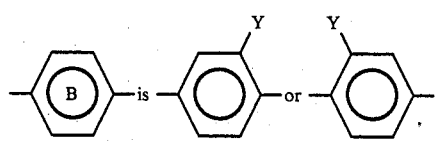

but X=Y=H does not exist. Accordingly, the types A, B and C all have one or two substituents on the aromatic ring. In the above formulas, X denotes a hydrogen atom, a halogen atom or a nitro group. Examples of the halogen atom are most preferably a fluorine atom and a chlorine atom. In case of a bromine atom and an iodine atom, the transition temperature lowers but coloration is likely to occur during the long-term storage.

The compounds (I) have, in molecules, no such conjugated trans-double bond unstable to light or azomethine bond (—CH=N—) unstable to water as seen in DOBAMBC, and are therefore chemically stable. Moreover, the compounds (I) are extremely free of such coloration as seen in DOBAMBC or azoxy compounds except a compound wherein the biphenyl ring has the nitro group as a substituent, and they are colorless per se. The compounds (I) are therefore said to be practical liquid crystalline compounds.

For liquid crystals to show the $S_C^*$ phase or other chiral smectic phases, the system has to be chiral, and to this end a method is employed wherein a chiral group is introduced into a molecule or other chiral substances are added to liquid crystals showing the $S_C$ phase or other tilt-type smectic phases. However, in the latter method, the spontaneous polarization to be described later is too low to provide a sufficient speed of response. The former method is thus commonly employed. In the compounds (I), optically active alcohols such as (s)-2-methylbutyl alcohol, etc. used as chiral starting materials are introduced into molecules by an ester linkage, and the introducing process is commercially easy to perform.

The ferroelectric liquid crystals permit high-speed response compared to the conventional liquid crystals such as the TN mode, and the like because they have the spontaneous polarization which directly interacts with the applied electric field. If the viscosity of the liquid crystals is constant, the larger the value of the spontaneous polarization the higher the speed of response. The spontaneous polarization is therefore one of the most important properties in the ferroelectric liquid crystals.

In order to increase the spontaneous polarization, it is deemed advisable that a high intermolecular permanent dipole (e.g. a >C=O linkage) and an asymmetric common atom are present as closely as possible. A common example of the intermolecular permanent dipole is a carbonyl linkage, and ester compounds of optically active alcohols such as DOBAMBC have relatively high spontaneous polarization.

The compounds (I) have a structure that the optically active group is connected to the benzene ring via the ester linkage as shown above. In the compounds with such structure, for example, in case of using (S)-2-methylbutanol as an optical starting material, the asymmetric carbon atom comes to be spaced apart from the carbonyl group by 3 atoms, and the spontaneous polarization of such compound is mostly about 1 to 10 $nC/cm^2$. Meanwhile in case of using optically active secondary alcohols, e.g. 2-octanol and 2-butanol as optical starting materials, the position of the asymmetric carbon atom gets closer by 1 atom to the carbonyl group, and the spontaneous polarization can become about 10 times. Moreover, in case of using as an optical starting material (S)-3-methylpentanol or (S)-4-methylhexanol wherein the asymmetric carbon atom is more spaced apart from the carbonyl group than (S)-2-methylbutanol, the spontaneous polarization goes lower, less than 1 nC/cm².

The chiral smectic liquid crystals usually take a helical structure as a whole such that tilt directions of molecules relative to layers are slightly deviated from one layer to another. However, where the ferroelectric liquid crystals are used as display elements, they have to be formed into cells of uniform homogeneous alignment with the helical structure disappearing. Generally, the helical structure is said to disappear when the cell thickness is less than the helical pitch. In order that the cell thickness is not made so small, the helical pitch of the liquid crystals is preferably more than a certain value (7 to 8 micrometers). The helical pitch can readily be adjusted by adding racemic compounds thereof or liquid crystalline compounds having the inversely helical direction. This has a great influence on the above-described spontaneous polarization.

In the compounds (I), the tricyclic types B and C have a helical pitch of a few micrometers, and the bicyclic type A has a helical pitch of 1 to 3 micrometers like DOBAMBC.

The great feature of the compounds (I) is that they have the substituent X. The compounds with the substituent X being H are introduced in the reviews by Goodby et al. taken earlier.

The effects brought forth by introducing the substituent X are, for example, as follows.

The unsubstituted compounds of type A are known ones described in the above reviews. The compound wherein R is C₁₀H₂₁O and Q* is a (S)-2-methylbutyl group has the $S_A$-$S_C^*$ transition temperature of 37° C., much lower than the melting point of 51° C. The $S_C^*$ phase therefore appears when the temperature lowers, but tends to crystallize and is unstable. Accordingly, it is difficult to measure properties thereof such as spontaneous polarization, and so forth.

Meanwhile, in the compound with one fluorine atom introduced

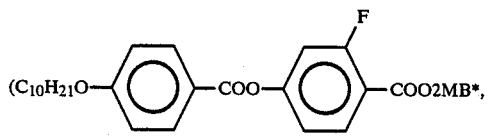

namely a compound of type A wherein R is $C_{10}H_{21}O$,

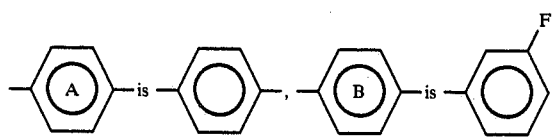

and Q* is 2MB*; 2MB* is a (S)-2-methylbutyl group), the $S_A$-$S_C^*$ transition temperature little lowers and is 35° C.; however the melting point remarkably lowers and is 38° C. The temperature difference is only 3° C. and crystallization does not easily occur in the room temperature range. Moreover, in the compound with two fluorine atoms introduced

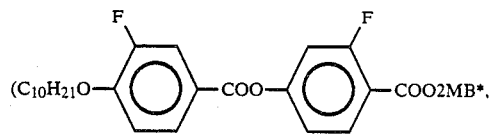

namely a compound of type A wherein R is $C_{10}H_{21}O$,

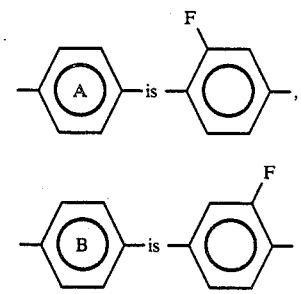

and Q* is 2MB*), the $S_A$-$S_C^*$ transition temperature somewhat lowers and is 30.5° C., but the melting point lowers more and is 24° C. The compound shows the $S_C^*$ enantiotropically within the range of 24° to 30.5° C., becomes hard to crystallize and keeps the $S_C^*$ phase in the room temperature range of 15° to 24° C. for more than two months.

In the compound with one chlorine atom introduced

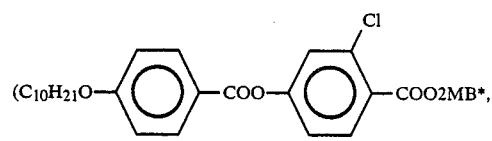

namely a compound of type A wherein R is $C_{10}H_{21}O$,

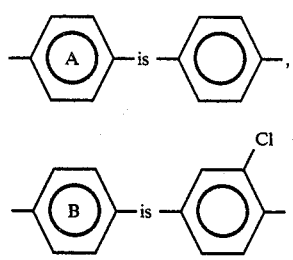

and Q is 2MB*), the $S_A$–$S_C^*$ transition temperature is 12° C. and the melting point is 28.5° C.; both lower greatly as compared to the compounds with the fluorine atom introduced. This compound can remarkably decrease the melting point by adding only a small amount thereof to other tricyclic liquid crystalline compounds having the high and wide temperature range. The order of the substituents X that decrease the melting point and the transition temperature is mostly NO₂>Cl>F.

For the ferroelectric liquid crystals to be used as practical display elements, it is important that they show the $S_C^*$ phase in the wide temperature range including room temperature. Also the compounds (I) singly take the $S_C^*$ phase and some have the melting point close to room temperature (for example, a compound of type C represented by formula

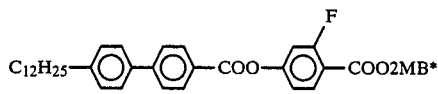

wherein R is C₁₂H₂₅,

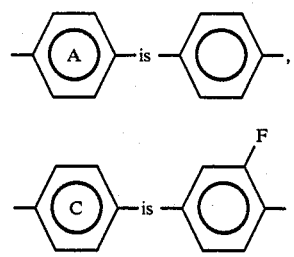

and Q is 2MB* takes the $S_C^*$ phase below 92° C. having the melting point of 38.6° C. and does not crystallize for a long period of time in the room temperature range keeping the $S_C^*$ phase). To obtain excellent properties, it is effective that these compounds are mixed and used as a liquid crystalline composition. If however the nematic liquid crystals different only in carbon number of an alkyl group are mixed, decrease in melting point, and the like do not occur so much; it is necessary to mix the compounds different in structure of a core. Nevertheless, when the compounds greatly different in structure are mixed, the phase separation tends to take place, and other transition temperatures such as $S_A$-I and $S_C^*$-$S_A$ points decrease more than the melting point, making narrow the temperature range of the $S_C^*$ phase. It is therefore advisable to mix the compounds having similar core structures. The compounds (I) include a large number of compounds structurally similar depending on the type, position and number of the halogen atom. The composition having the $S_C^*$ phase in the wide temperature range including the low temperature range can be afforded by mixing these compounds to decrease the melting point without much lowering other transition temperatures, particularly, the $S_C^*$-$S_A$ point.

A method for synthesizing the compounds (I) will be described below.

The method for synthesizing the compounds (I) shall be divided into two methods α and β depending on whether the optically active alcohol used as a chiral source is a primary alcohol or a secondary alcohol with a hydroxyl group directly bonded to an asymmetric carbon atom.

That is, the method β is applicable when the secondary alcohol is used. The methods α and β are both applicable when the primary alcohol is used; the method α is generally more convenient.

(1) Synthesis according to the method α:
(a) Types A and C:
The compounds of types A and C can readily be produced by reacting a carboxylic acid of formula

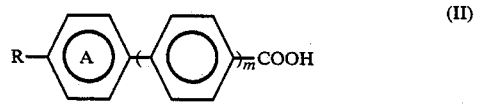

with a chlorinating agent such as thionyl chloride, or the like to form an acid chloride of formula

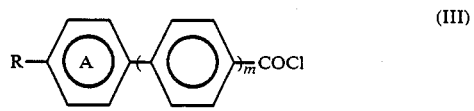

and reacting said acid chloride with an optically active alcohol ester of 4-hydroxybenzoic acid of formula

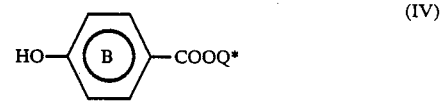

or its substituted substance in the presence of a basic substance such as pyridine (in the above formulas the individual symbols have the aforesaid meanings). This is schematically shown below.

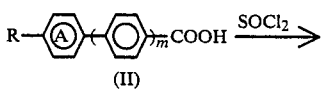

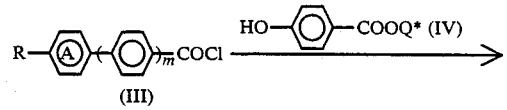

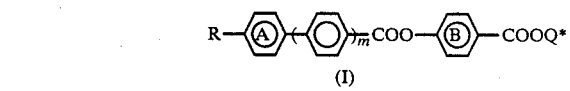

type A (m = 0), type C (m = 1)

Examples of the carboxylic acid (II) here in case of type A are 4-alkylbenzoic acid, 4-alkoxybenzoic acid and their substituted substances; Examples thereof in case of type C are 2'- and 3'-substituted substances of 4'-alkylbiphenyl-4-carboxylic acid and 4'-alkoxybiphenyl-4-carboxylic acid. Many of them are known substances. Some of unsubstituted substances are on the market and easy to synthesize. Of substituted substances, 3-substituted benzoic acid or 3'-substituted biphenyl-4-carboxylic acid except fluorine-substituted substances is obtained by directly reacting the corresponding 4-alkyl(or 4-alkoxy)benzoic acid or 4'-alkyl(or 4'-alkoxy)biphenyl-4-carboxylic acid with bromine or iodine, or a chlorinating agent such as N-chlorosuccinimide (NCS), chloramine-T or dichloramine-T, or a nitrating agent such as fuming nitric acid using acetic acid as a solvent.

Fluorine-substituted benzoic acid or 2-substituted benzoic acid can be obtained by reacting the corresponding substituted alkyl(or alkoxy)benzene with acetyl chloride and aluminum chloride to form a substituted substance of 4-alkyl(or 4-alkoxy)acetophenone reacting this substituted substance with a sodium hypobromite aqueous solution and then treating the reaction mixture with an acid. This is schematically shown below.

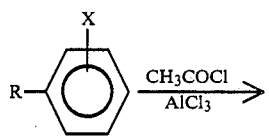

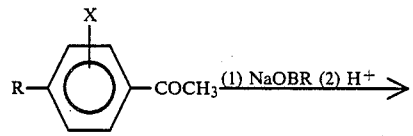

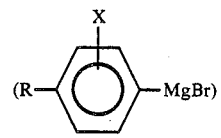

with methyl 4-iodobenzoate in the presence of a catalyst such as palladium chloride and then hydrolyzing the reaction mixture. It may be also formed such that iodobenzene is used instead of methyl 4-iodobenzoate and the resulting biphenyl compound is subjected to acetylation and haloform reaction. This is schematically shown below.

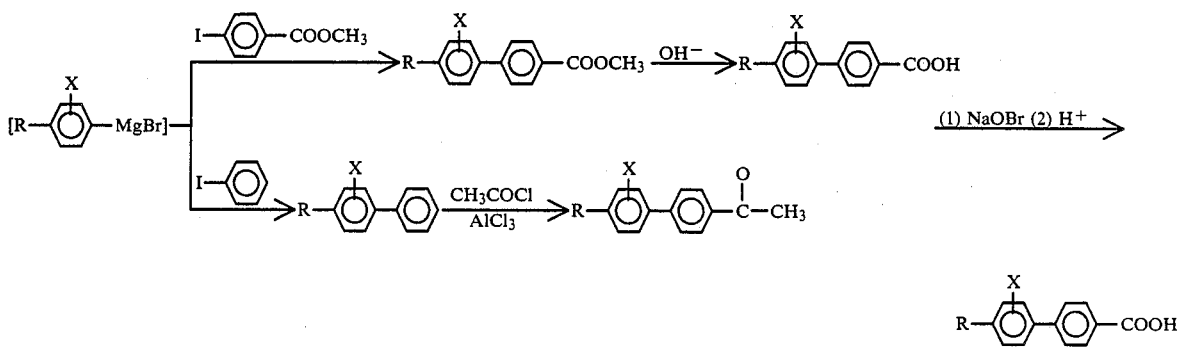

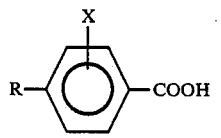

A compound with X of flourine or chlorine can be obtained by, as schematically shown below, conducting the reaction with bromine in a solvent such as chloroform to form a 4-bromoalkyl(or 4-alkoxy)benzene substituted substance, reacting the substituted substance with magnesium in a solvent such as tetrahydrofuran to form a Grignard compound, reacting said compound with carbon dioxide and then treating the resulting compound with an acid.

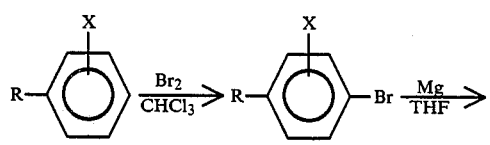

(X = F or Cl)

Fluorine-substituted or 2'-substituted 4'-alkyl(or 4'-alkoxy)biphenyl-4-carboxylic acid can be afforded by reacting the aforesaid Grignard compound The above benzoic acid or biphenyl-4-carboxylic acid derivatives wherein R is an alkoxy group may also be obtained by alkylating the corresponding 2-substituted or 3-substituted 4-hydroxybenzoic acid, or 2'-substituted or 3'-substituted 4'-hydroxybiphenyl-4-carboxylic acid in a usual manner; this method is more common.

An ester of optically active alcohol of formula

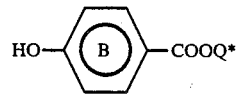

(IV)

can be afforded by condensing 4-hydroxybenzoic acid of formula

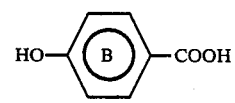

(V)

or its substituted substance with an optically active alcohol of formula

Q*OH in the presence of an acid catalyst such as sulfuric acid on dehydration. On this occassion, if the optically active alcohol is a secondary alcohol, racemization is most likely to occur. Thus, only a primary alcohol is usable as the optically active alcohol.

(b) Type B:

The compound of type B can be obtained by reacting an acid chloride (III) wherein m=0 derived from 4-alkyl(or 4-alkoxy)benzoic acid of formula (II) wherein m=0 or its substituted substance with an optically active alcohol ester of 4'-hydroxybiphenyl-4-carboxylic acid represented by formula (VI)

HO—(B)—COOQ*

(the symbols in the formulas have the same meanings as above) or its substituted substance. The ester of optically active alcohol (VI) can be formed from the corresponding 4'-hydroxybiphenyl-4-carboxylic acid or its substituted substance in the same manner as the ester (IV).

(2) Synthesis according to the method β:
(a) Types A and C:

The method β comprises reacting the acid chloride (III) with 4-hydroxybenzoic acid (V) or its substituted substance in the presence of a basic substance such as pyridine to form a carboxylic acid (VII), converting this carboxylic acid into an acid chloride by a chlorinating agent such as thionyl chloride and then reacting the acid chloride with the optically active alcohol Q*OH in the presence of a basic substance such as pyridine. This is schematically shown below.

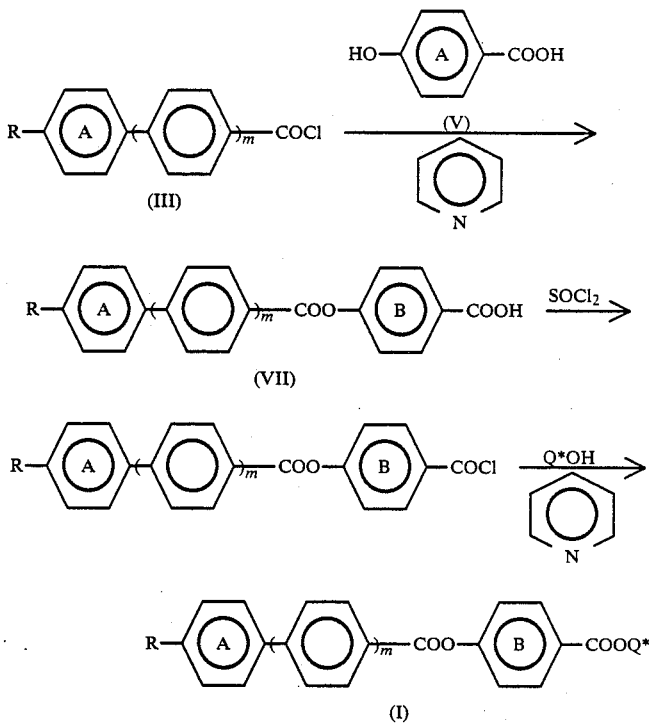

type A (m = 0), type C (m = 1)

Another method β comprises, a schematically shown below, reacting the acid chloride (III) with 4-hydroxybenzaldehyde or its halo-substituted substance to form an aldehyde (VIII), and then oxidizing the aldehyde with chromic anhydride to obtain the carboxylic acid (VII).

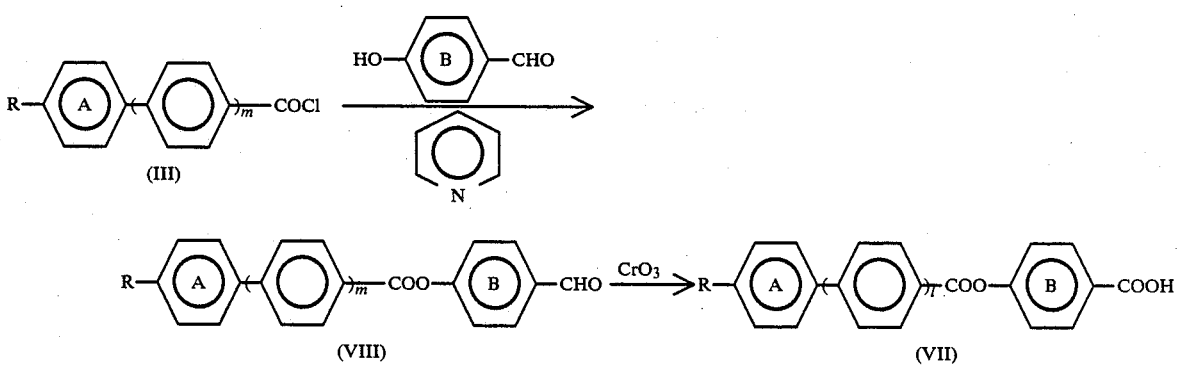

Part of the 4-hydroxybenzoic acid substituted substances used in the methods α and β are commercially available. Others can be obtained by acetylating the corresponding substituted anisoles with acetyl chloride and aluminum chloride, then converting an acetyl group into a carboxylic acid with a sodium hypobromite aqueous solution and demethylating the resulting substance with hydrobromic acid. This is schematically shown below.

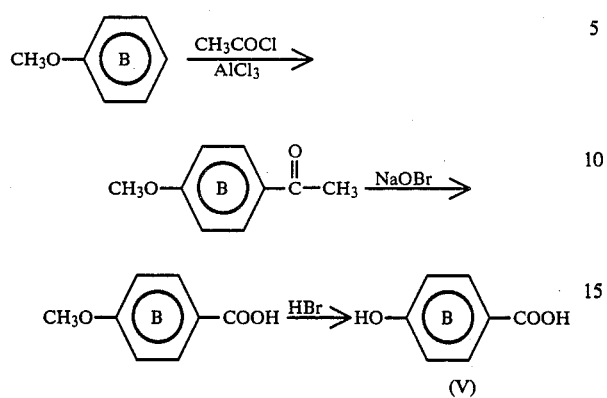

(V)

It may also be obtained by brominating or iodizing the substituted phenol, then cyanogenating the substance with cuprous cyanide and further conducting alkali hydrolysis. This is schematically shown below.

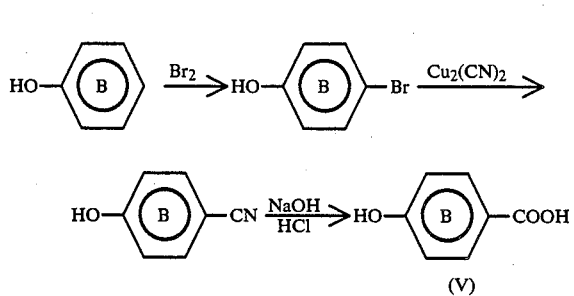

(V)

(b) Type B:

The compound of type B can be afforded as in (a) above using the acid chloride (III) wherein m=0 derived from 4-alkyl(or 4-alkoxy)benzoic acid of formula (II) wherein m=0 and 4'-hydroxybiphenyl-4-carboxylic acid of formula

(IX)

or its substituted substance.

The substituted substance of 4'-hydroxybiphenyl-4-carboxylic acid here referred to can be obtained by coupling a Grignard compound derived from a 4-bromoanisole substituted substance with iodobenzene in the presence of a catalyst such as palladium chloride to form a 4'-methoxybiphenyl substituted substance, then acetylating the substituted substance with acetyl chloride and aluminum chloride, converting it into a carboxylic acid with sodium hypobromite aqueous solution, and performing demethylation with hydrobromic acid. This is schematically shown below.

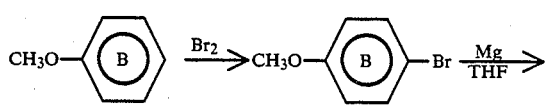

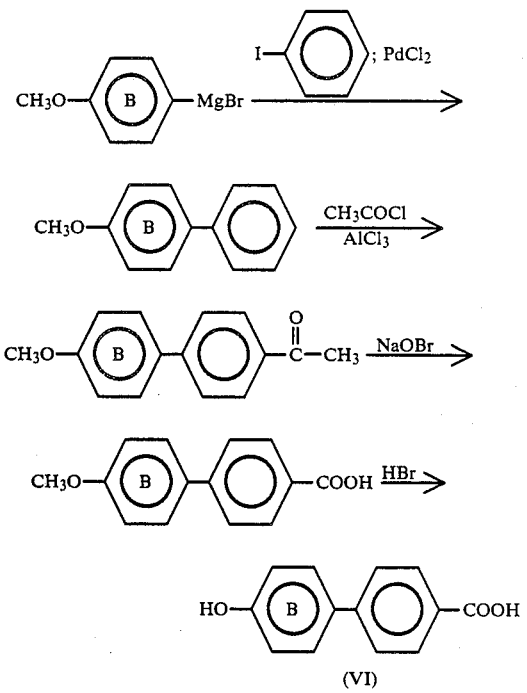

(VI)

Moreover, the Grignard compound may be reacted with methyl 4-iodobenzoate instead of iodobenzene, followed by alkali hydrolysis.

The liquid crystalline compound or composition of this invention can be used as liquid crystal display cells by holding it as a thin film having a uniform thickness (about 1 to 20 micrometers) between two transparent electrodes.

In the display cells, the molecules of liquid crystals have to be of a monodomain which are homogeneous with the long axis of the molecule being parallel to the electrode surface and are aligned in a uniform direction. For this purpose, such method is commonly employed that cooling is gradually performed from an isotropic liquid phase to a liquid crystalline phase for alignment by subjecting the electrode surface to aligning treatment such as rubbing or depositing, or applying an electric field or a magnetic field, or providing a temperature gradient, or conjointly using the above means. In the compound or composition of this invention as well, the cells of uniformly aligned monodomain can be produced by such method.

In the present inention, the compounds (I) can easily be produced commercially in comparison with DOBAMBC known as a typical ferroelectric liquid crystalline compound as shown in Examples to be described later, and most of the compounds (I) are colorless per se and have excellent stability to light, water and heat. The temperature range in which to show the ferroelectricity is various; some compounds have the temperature range near room temperature and others have the wide temperature range. Compared to the unsubstituted esters, the temperature range of the compounds (I) is close to room temperature. Said compounds (I) of this invention thus possess the excellent characteristics.

The compositions of this invention likewise have the lower melting point than the compounds used singly and are also utilizable in the wide temperature range including room temperature.

What is more, the ferroelectric liquid crystalline compounds and compositions in this invention have, like the conventional ferroelectric liquid crystals, very high speed of response which is more than 100 times that of the nematic liquid crystals. They are therefore expected to be available as light switching elements for display.

The following Examples illustrate this invention in more detail, but this invention is not limited to these Examples.

EXAMPLE 1

[Synthesis of 4-[(S)-2-methylbutyloxycarbonyl]-3-chlorophenyl-4-tetradecyloxybenzoate]

3.34 g of 4-tetradecyloxybenzoic acid (10.0 mmols) was stirred in 10 ml of thionyl chloride and 0.5 ml of pyridine for 1 hour on refluxing by heating. Excess thionyl chloride was completely distilled off under reduced pressure to obtain oily tetradecyloxybenzoic acid chloride. When said chloride was left to stand at room temperature, it crystallized. The resulting product was used in the subsequent reaction without purification. That is, 2.43 g (10 mmols) of (S)-2-methylbutyl 2-chloro-4-hydroxybenzoate

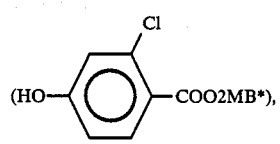

4 ml of pyridine and 8 ml of methylene chloride were added to the above product, and the mixture was reacted for 2 hours under reflux.

After the reaction mixture was left to cool up to room temperature, 100 ml of ethyl acetate and a 30 ml of 10% hydrochloric acid solution were added and the mixture was well stirred. The organic layer was washed with water until the aqueous layer was neutralized, and dried with anhydrous sodium sulfate. The solvent was distilled off. The resulting crude oil was subjected to silica gel chromatography and further recrystallized from ethanol to obtain 4.30 g of 4-[(S)-2-methylbutyloxycarbonyl]-3-chlorophenyl 4-tetradecyloxybenzoate (yield 77%).

The structure was confirmed by nuclear magnetic resonance spectroscopy (NMR), infrared absorption spectroscopy (IR) and mass spectroscopy (MS). The transition temperature was measured by a polarising microscope equipped with a temperature adjusting stage and a differential scanning calorimeter (DSC).

NMR:
δ6.9–8.0 (multiplet, 7H, aromatic-H),
δ4.20 (double doublet, 2H, COOCH₂),
δ4.04 (triplet, 2H,

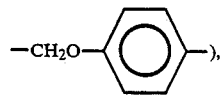

δ1.6–2.0 (multiplet 3H), δ1.2–1.5 (multiplet 24H),
δ0.8–1.1 (multiplet, 9H, —CH₃).

IR: 1735, 1710, 1605, 1520, 1480, 1400, 1260, 1200, 1170, 1125, 1080, 1008, 875, 845, 770, 760, 690 cm⁻¹.

MS: m/e=558, 560 (P⁺).

(P⁺ indicates a parent peak.)

Transition temperatures: I-S$_A$ 31.0° C., S$_A$-S$_C$* −1° C. (monotropic), m.p. 23.0° C.

The following compounds of formula (A-1) were obtained using, instead of said 4-tetradecyloxybenzoic acid, 4-hexyloxybenzoic acid, 4-octyloxybenzoic acid, 4-decyloxybenzoic acid, 4-dodecyloxybenzoic acid, 4-hexadecyloxybenzoic acid, 4-octadecyloxybenzoic acid and 4-decylbenzoic acid.

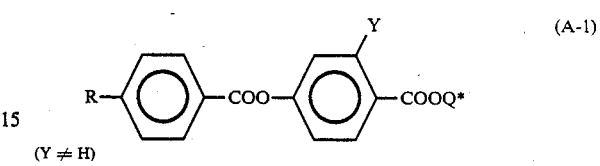

(Y ≠ H)

3-Chloro-4-[(S)-2-methylbutyloxycarbonyl]phenyl 4-hexyloxybenzoate,
3-chloro-4-[(S)-2-methylbutyloxycarbonyl]phenyl 4-octyloxybenzoate,
3-chloro-4-[(S)-2-methylbutyloxycarbonyl]phenyl 4-decyloxybenzoate,
3-chloro-4-[(S)-2-methylbutyloxycarbonyl]phenyl 4-dodecyloxybenzoate,
3-chloro-4-[(S)-2-methylbutyloxycarbonyl]phenyl 4-hexadecyloxybenzoate, and
3-chloro-4-[(S)-2-methylbutyloxycarbonyl]phenyl 4-octadecyloxybenzoate.

Subsequently, the following compounds of formula (A-1) were obtained using (S)-2-methylbutyl 2-fluoro-4-hydroxybenzoate instead of said (S)-2-methylbutyl 2-chloro-4-hydroxybenzoate, and the above 4-substituted benzoic acids.

3-Fluoro-4-[(S)-2-methylbutyloxycarbonyl]phynyl 4-hexyloxybensoate,
3-fluoro-4-[(S)-2-methylbutyloxycarbonyl]phenyl 4-octyloxybenzoate,
3-fluoro-4-[(S)-2-methylbutyloxycarbonyl]phenyl 4-decyloxybenzoate,
3-fluoro-4-[(S)-2-methylbutyloxycarbonyl]phenyl 4-dodecyloxybenzoate,
3-fluoro-4—(S)-2-methylbutyloxycarbonyl]phenyl 4-tetradecyloxybenzoate, and
3-fluoro-4-[(S)-2-methylbutyloxycarbonyl]phenyl 4-octadecyloxybenzoate.

The transition temperatures of these compounds are shown in Table 1.

EXAMPLE 2

[Synthesis of 4-[(R)-1-methylpropyloxycarbonyl]-3-fluorophenyl-4-octyloxybenzoate]

4-Octyloxybenzoic acid chloride (10.74 g) and 6.24 g of 2-fluoro-4-hydroxybenzoic acid were stirred in 20 ml of pyridine and 50 ml of methylene chloride for 3 hours on refluxing by heating. After the reaction mixture was left to cool, it was neutralized with 10% hydrochloric acid, and the precipitated crystals were separated by filtration, and washed with water and then with cold methanol. The resulting crude crystals were recrystallized from ethanol to obtain 12.11 g of 2-fluoro-4-(4-octyloxybenzoyloxy)benzoic acid (yield 78%) which was liquid crystalline (transition temperatures: m.p. 147° to 148° C., N-I point 217° C.).

Ten grams of the resulting product was stirred with 30 ml of thionyl chloride and 1 ml of pyridine for 2 hours on heating, then excess thionyl chloride was distilled off thionyl chloride. Toluene was added to the residue and the insoluble material was separated by filtration. Thereafter, toluene was distilled off to afford 7.7 g of 2-fluoro-4-(4-octyloxybenzoyloxy)benzoic acid chloride as white crystals.

To 4.07 g of said acid chloride were added 0.2 g of (R)-2-butanol, 10 ml of pyridine and 20 ml of methylene chloride, and the mixture was reacted for 2 hours on refluxing by heating. The same aftertreatment as in Example 1 was performed to obtain 2.89 g of 4-[(R)-1-methylpropyloxycarbonyl]-3-fluorophenyl 4-octyloxybenzoate (yield 65%).

Transition temperatures:
I-$S_A$ 31° C., $S_A$-$S_C$* 4.5° C.; m.p. was unknown because the product did not crystallize.

The above procedure was repeated except using (R)-2-octanol instead of (R)-2-butanol. There resulted 4-[(R)-1-methylheptyloxycarbonyl]-3-fluorophenyl 4-octyloxybenzoate.

Transition temperatures:
I-$S_A$ 16° C. (monotropic), m.p. 26.5° C.

TABLE 1

Transition temperatures (°C.) of (A-1)

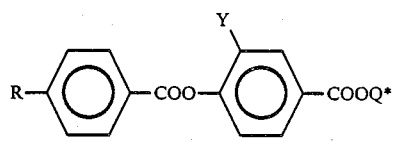

| No. | R | Y | Q* | C | $S_C$* | $S_A$ | I |
|---|---|---|---|---|---|---|---|
| 1 | $C_6H_{13}O$ | Cl | 2MB* | •26 | — | — | • |
| 2 | $C_8H_{17}O$ | " | " | •31 | (•1) | (•19) | • |
| 3 | $C_{10}H_{21}O$ | " | " | •28.5 | (•12) | (•22) | • |
| 4 | $C_{12}H_{25}O$ | " | " | •34 | (•17) | (•25.5) | • |
| 5 | $C_{14}H_{29}O$ | " | " | •23 | (•−3) | •32 | • |
| 6 | $C_{16}H_{33}O$ | " | " | •22 | (•9) | •33.5 | • |
| 7 | $C_{18}H_{37}O$ | " | " | •45 | (•16) | (•21) | • |
| 8 | $C_6H_{13}O$ | F | " | •29 | — | •50.5 | • |
| 9 | $C_8H_{17}O$ | " | " | •10 | •35 | •60 | • |
| 10 | $C_{10}H_{21}O$ | " | " | •38 | (•34) | •53.5 | • |
| 11 | $C_{12}H_{25}O$ | " | " | •39 | (•36.5) | •62 | • |
| 12 | $C_{14}H_{29}O$ | " | " | •41 | (•24) | •52.5 | • |
| 13 | $C_{16}H_{33}O$ | " | " | •38 | (•27) | •60 | • |
| 14 | $C_{18}H_{37}O$ | " | " | •45 | — | •50 | • |
| 15 | $C_8H_{17}O$ | " | 1MP | •* | (•4.5) | •31 | • |
| 16 | " | " | 1MH | •26.5 | — | (•16) | • |
| 17 | $C_{10}H_{21}$ | Cl | 2MB | •−28 | — | — | • |
| 18 | " | F | " | •* | — | — | • |

(Notes)
• indicates that the phase is present, and — indicates that the phase is absent.
The figure next to • indicates the transition temperature to a phase of higher temperature, and parentheses indicate that the phase is monotropic.
1MP denotes a (R)—1-methylpropyl group and 1MH denotes a (R)—1-methylheptyl group.
*indicates that the melting point is unknown because the product did not crystallize.

EXAMPLE 3

The procedure of Example 1 was followed except using (S)-2-methylbutyl 3-chloro-4-hydroxybenzoate or (S)-2-methylbutyl 3-fluoro-4-hydroxybenzoate instead of (S)-2-methylbutyl 2-chloro-4-hydroxybenzoate or (S)-2-methylbutyl 2-fluoro-4-hydroxybenzoate. There resulted the following compounds of formula (A-2) (provided Y is not hydrogen).

(A-2)

2-Chloro-4-[(S)-2-methylbutyloxycarbonyl]phenyl 4-hexyloxybenzoate,
2-Chloro-4-[(S)-2-methylbutyloxycarbonyl]phenyl 4-decyloxybenzoate,
2-Chloro-4-[(S)-2-methylbutyloxycarbonyl]phenyl 4-tetradecyloxybenzoate,
2-Chloro-4-[(S)-2-methylbutyloxycarbonyl]phenyl 4-octadecyloxybenzoate,
2-Fluoro-4-[(S)-2-methylbutyloxycarbonyl]phenyl 4-decyloxybenzoate, and
2-Fluoro-4-[(S)-2-methylbutyloxycarbonyl]phenyl 4-tetradecyloxybenzoate.

These compounds did not show the $S_C$* phase. The transition temperatures thereof are shown in Table 2.

TABLE 2

Transition temperatures (°C.) of (A-2)

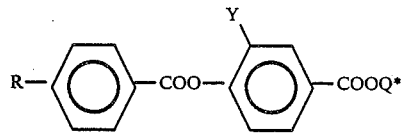

| No. | R | Y | Q* | C | $S_A$ | N* | I |
|---|---|---|---|---|---|---|---|
| 1 | $C_6H_{13}O$ | Cl | 2MB | •27.5 | (•22) | — | • |
| 2 | $C_{10}H_{21}O$ | " | " | • | (•−1) | (•2.5) | • |
| 3 | $C_{14}H_{29}O$ | " | " | •30.5 | (•10.5) | — | • |
| 4 | $C_{18}H_{37}O$ | " | " | •25.5 | •30 | — | • |
| 5 | $C_{10}H_{21}O$ | F | " | •25.5 | (•7) | (•17.5) | • |
| 6 | $C_{14}H_{29}O$ | " | " | •40 | (•34) | •55 | • |

EXAMPLE 4

[Synthesis of (S)-2-methylbutyl 2-chloro-4-hydroxybenzoate]

2-Chloro-4-hydroxybenzoic acid (17.2 g: 100 mmols), 10.5 g (120 mmols) of (S)-2-methylbutanol and 0.17 g (1 mmol) of p-toluenesulfonic acid were refluxed in 100 ml of toluene on heating. Azeotropic water was removed with a Dean Stark trap. After water was no longer distilled off, the residue was left to cool up to room temperature. The resulting product was washed with a sodium bicarbonate aqueous solution until the aqueous phase became alkaline. The product was further washed with water and then with saturated sodium chloride aqueous solution, and dried with anhydrous sodium sulfate. Excess toluene and (S)-2-methylbutanol were mostly distilled off under reduced pressure and the residue was recrystallized from n-hexane to obtain 23.8 g of (S)-2-methylbutyl 2-chloro-4-hydroxybenzoate as a white crystal.

NMR:
δ7.80 (doublet, 1H,

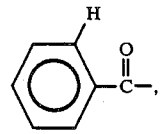

δ6.94 (doublet,

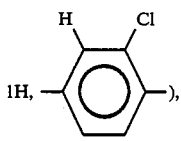

δ6.76 (double doublet, 1H,

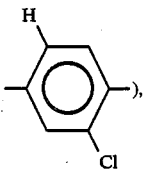

δ7.3 (broad singlet, 1H, OH),
δ4.12 (double doublet,2H, O—CH$_2$), δ1.7–7.0 (multiplet, 1H, —CH—), δ1.2–1.6 (multiplet, 2H, C—CH$_2$—C), δ0.8–1.1 (multiplet 6H, —CH$_3$).

(S)-2-Methylbutyl 2-fluoro-4-hydroxybenzoate, (S)-2-methylbutyl 3-chloro-4-hydroxybenzoate or (S)-2-methylbutyl 3-fluoro-4-hydroxybenzoate was obtained as above except using 2-fluoro-4-hydroxybenzoic acid, 3-chloro-4-hydroxybenzoic acid or 3-fluoro-4-hydroxybenzoic acid instead of 2-chloro-4-hydroxybenzoic acid.

EXAMPLE 5

[Synthesis of 4-[(S)-2-methylbutyloxycarbonyl]phenyl 2-fluoro-4-decyloxybenzoate]

The procedure of Example 1 was repeated except using (S)-2-methylbutyl 4-hydroxybenzoate instead of (S)-2-methylbutyl 2-chloro-4-hydroxybenzoate, and 2-fluoro-4-decyloxybenzoic acid instead of 4-tetradecyloxybenzoic acid, respectively.

NMR:
δ7.85–8.1 (multiplet, 3H,

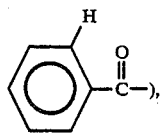

δ7.2–7.3 (doublet, 2H,

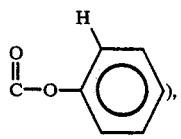

δ6.5–6.8 (multiplet 2H,

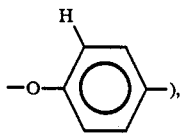

δ4.13 (double doublet, 2H,

δ3.95 (triplet, 2H,

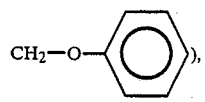

δ1.5–2.0 (multiplet, 3H), δ1.1–1.5 (multiplet, 16H), δ0.8–1.05 (multiplet 9H, —CH$_3$).

Transition temperatures: I-S$_A$ 37.5° C., m.p. 26.5° C.

The following compounds of formula (A-3) (provided X is not hydrogen) were obtained as above except using 2-chloro-4-decyloxybenzoic acid or 2-chloro-4-tetradecyloxybenzoic acid instead of said 2-fluoro-4-decyloxybenzoic acid.

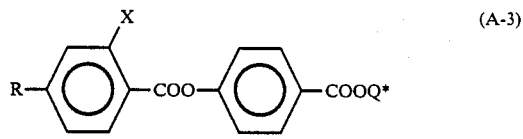

4-[(S)-2-methylbutyloxycarbonyl]phenyl 2-chloro-4-decyloxybenzoate

Transition temperatures: I-S$_A$ (−6° C.,) m.p. 24.5° C.

4-[(S)-2-methylbutyloxycarbonyl]phenyl 2-chloro-4-tetradecyloxybenzoate

Transition temperatures: I-S$_A$ 52° C., m.p. 38° C.

EXAMPLE 6

Synthesis of 4-[(S)-2-methylbutyloxycarbonyl)phenyl]3-fluoro-4-decyloxybenzoate]

The procedure of Example 5 was followed except using 3-fluoro-4-decyloxybenzoic acid instead of 2-fluoro-4-decyloxybenzic acid. There was obtained 4-[(S)-2-methylbutyloxycarbonyl]phenyl 3fluoro-4-decyloxybenzoate.

NMR:
δ7.8–8.1 (multiplet, 4H,

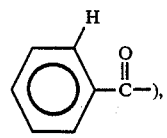

δ7.2–7.3 (doublet, 2H,

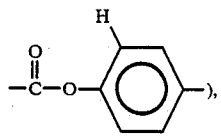

δ6.6–6.8 (multiplet, 1H,

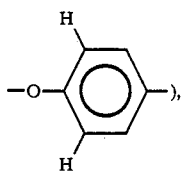

δ4.15 (double doublet, 2H,

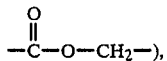

δ3.96 (triplet, 2H,

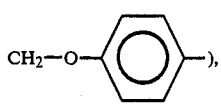

δ1.5–2.0 (multiplet, 3H,

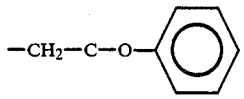

and —CH—),

δ1.1–1.5 (multiplet, 16H, other CH₂), δ0.8–1.1 (multiplet, 9H, —CH₃).
Transition temperatures:
$S_A$-I 48° C., $S_A$-$S_C$* (26° C.), m.p. 36° C.

The following compounds of formula (A-4) were obtained as above except using 3-chloro-4-decyloxybenzoic acid, 3-chloro-4-dodecyloxybenzoic acid or 3-nitro-4-tetradecyloxybenzoic acid instead of 3-fluoro-4-decyloxybenzoic acid.

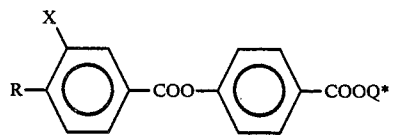

(A-4)

4-[-(S)-2-methylbutyloxycarbonyl]phenyl 3-chloro-4-decyloxybenzoate
Transition temperatures: $S_A$-I (20° C.), m.p. 36.5° C.
4-[-(S)-2-methylbutyloxycarbonyl]phenyl 3-chloro-4-dodecyloxybenzoate
Transition temperatures: $S_A$-I 50° C., m.p. 36.5° C.
4-[-(S)-2-methylbutyloxycarbonyl]phenyl 3-nitro-4-tetradecyloxybenzoate
Transition temperatures: $S_A$-I (23° C.), m.p. 57° C.

EXAMPLE 7
[Synthesis of 3-fluoro-4-[-(S)-2-methylbutyloxycarbonyl]phenyl 3-fluoro-4-decyloxybenzoate]

The procedure of Example 5 was followed except using (S)-2-methylbutyl 2-fluoro-4-hydroxybenzoate instead of (S)-2-methylbutyl 4-hydroxybenzoate. There resulted 3-fluoro-4—(S)-2-methylbutyloxycarbonyl]-phenyl-3-fluoro-4-decyloxybenzoate.
Transition temperatures:
$S_A$-I 48.5° C., $S_A$-$S_C$* 30.5° C., m.p. 24.0° C.

The following compound of formula (A-5) (provided X and Y are not hydrogens) was formed as above except using 3-fluoro-4-dodecyloxybenzoic acid instead of said 3-fluoro-4-decyloxybenzoic acid.

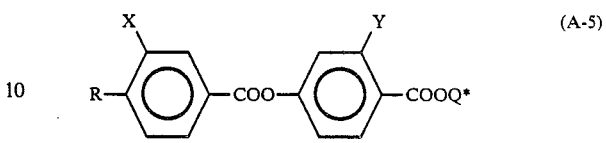

(A-5)

3-Fluoro-4-[-(S)-2-methylbutyloxycarbonyl]phenyl 3-fluoro-4-dodecyloxybenzoate
Transition temperatures:
$S_A$-I 51° C., $S_A$-$S_C$* 27.5° C., m.p. 27° C.

EXAMPLE 8
[Synthesis of 4-{4—(S)-2-methylbutyloxycarbonyl]phenyl}phenyl 3-fluoro-4-dodecyloxybenzoate]

3-Fluoro-4-dodecyloxybenzoic acid chloride (3.32 g: 10 mmols) and 2.84 g (10 mmols) of (S)-2-methylbutyl 4′-hydroxybiphenyl-4-carboxylate were reacted in 10 ml of pyridine and 15 ml of methylene chloride for 3 hours under reflux. After the reaction mixture was left to cool, 50 ml of ethyl acetate was added, and washed twice with 10% hydrochloric acid and once with each of a saturated sodium bicarbonate aqueous solution, water and a saturated sodium chloride aqueous solution. After the reaction product was dried with anhydrous sodium sulfate, the solvent was concentrated. Crude crystals obtained were purified by silica gel column chromatography (solvent: chloroform-hexane), and recrystallized from ethanol to obtain 4.64 g of 4-{4-[-(S)-2-methylbutyloxycarbonyl]phenyl}phenyl 3-fluoro-4-dodecyloxybenzoate.
NMR:
δ6.8–8.1 (multiplet, 11H, aromatic-H), δ4.12 (double doublet, 2H,

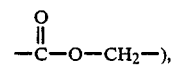

δ4.02 (triplet, 2H,

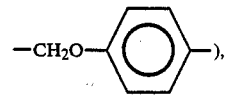

δ1.5–2.0 (multiplet,

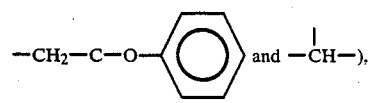

and —CH—),

δ1.1–1.5 (multiplet, 20H, other —CH₂), δ0.8–1.05 (multiplet, 9H, —CH₃).
IR: 1730, 1720, 1620, 1240, 1200, 1120, 935, 860, 770, 755 (cm⁻¹).
MS: m/e=618 (P+)
Transition temperatures:
$S_A$-I 150° C., $S_A$-$S_C$* 115° C., m.p. 58° C.

The following compounds of formula (B-1) (provided X is not hydrogen) were obtained as above except using 3-fluoro-4-decyloxybensoic acid chloride, 3-fluoro-4-tetradecyloxybenzoic acid chloride, 3-chloro-4-decyloxybenzoic acid chloride, 3-chloro-4-dodecyloxybenzoic acid chloride or 3-nitro-4-tetradecyloxybenzoic acid chloride instead of said 3-fluoro-4-dodecyloxybenzoic acid chloride.

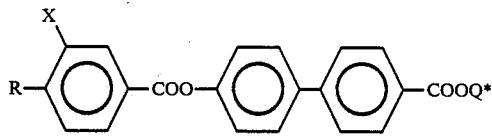

(B-1)

4-{4-[(S)-2-Methylbutyloxycarbonyl]phenyl}phenyl 3-fluoro-4-docyloxybenzoate,
4-{4-[(S)-2-methylbutyloxycarbonyl]phenyl}phenyl 3-fluoro-4-tetradecyloxybenzoate
4-{4-[(S)-2-methylbutyloxycarbonyl]phenyl}phenyl 3-chloro-4-decyloxybenzoate,
4-{4-[(S)-2-methylbutyloxycarbonyl]phenyl}phenyl 3-chloro-4-dodecyloxybenzoate, and
4-{4-[(S)-2-methylbutyloxycarbonyl]phenyl{phenyl 3-nitro-4-tetradecyloxybenzoate.

4-{4—(R)-1-methylheptyloxycarbonyl]phenyl}phenyl 3-fluoro-4-decyloxybenzoate, and
4-{4—(S)-3-methylpentyloxycarbonyl]phenyl}phenyl 3-fluoro-4-decyloxybenzoate.

The transition temperatures of these compounds are shown in Table 3.

Example 10

[Synthesis of 4-{4—(s)-2-methylbutyloxycarbonyl]phenyl}phenyl 2-fluoro-4-tetradecyloxybenzoate]

The procedure of Example 8 was repeated except using 2-fluoro-4-tetradecyloxybenzoic acid chloride instead of 3-fluoro-4-dodecyloxybenzoic acid chloride. There resulted 4-{4—(S)-2-methylbutyloxycarbonyl]phenyl}phenyl 2-fluoro-4-tetradecyloxybenzoate.

IR: 1730, 1715, 1620, 1500, 1270, 1180, 1130, 1110, 1005, 965, 825, 770, 755.

MS: m/e=646 (P+)

Transition temperatures:
N*-I 138.5° C., N*-$S_A$ 136.8° C., $S_A$-$S_C$* 85.5 C., m.p. 62° C.

The following compounds of formula (B-2) (provided X is not hydrogen) were obtained as above except using 2-fluoro-4-decyloxybenzoic acid or 2-chloro-4-dodecyloxybenzoic acid instead of 2-fluoro-4-tetradecyloxybenzoic acid.

TABLE 3

Transition temperature (°C.) of (B-1)

| No. | R | X | Q* | C | Sm* | $S_C$* | $S_A$ | N* | I |
|---|---|---|---|---|---|---|---|---|---|
| 1 | $C_{10}H_{21}O$ | F | 2MB* | •84 | — | •118 | •152 | — | • |
| 2 | $C_{12}H_{25}O$ | " | " | •58 | — | •115 | •150 | — | • |
| 3 | $C_{14}H_{29}O$ | " | " | •53 | (•50) | •110 | •146 | — | • |
| 4 | $C_{10}H_{21}O$ | Cl | " | •103— | — | •104 | •129 | •132 | • |
| 5 | $C_{12}H_{21}O$ | " | " | •66.5 | — | •95.5 | •127 | •137 | • |
| 6 | $C_{14}H_{29}O$ | $NO_2$ | " | •64 | — | •89 | •141 | — | • |
| 7 | $C_{10}H_{21}O$ | F | 1MP | •88 | — | (•79) | •136.5 | — | • |
| 8 | " | " | 1MH | •77 | (•73) $S_B$*** | •78 | •108.5 | — | • |
| 9 | " | " | 3MP** | •55 | (•50.4) | •89.5 | •138 | — | • |

(Notes)
*It indicates a chiral smectic phase closer to a crystalline phase than to a $S_C$* phase.
**It indicates a (S)—3-methylpentyl group.
*** Smectic B phase.

The transition temperatures of these compounds are shown in Table 3.

Example 9

[Synthesis of 4-{4-[(R)-1-methylpropyloxycarbonyl]phenyl}phenyl 3-fluoro-4-decyloxybenzoate]

The procedure of Example 2 was repeated using 3-fluoro-4-decyloxybenzoic acid chloride instead of 4-octyloxybenzoic acid chloride, and 4'-hydroxybiphenyl-4-carboxylic acid instead of 2-fluoro-4-hydroxybenzoic acid, respectively. There was obtained 4-{4-[(R)-1-methylpropyloxycarbonyl]phenyl}phenyl 3-fluoro-4-decyloxybenzoate.

Transition temperatures:
$S_A$-I 136.5° C., $S_A$-$S_C$* (79° C.), m.p. 88° C.

The following compounds of formula (B-1) were formed as above except using (R)-2-octanol or (S)-3-methylpentanol instead of (R)-2-butanol.

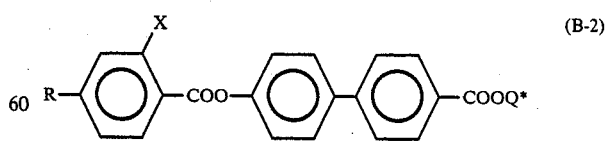

(B-2)

4-{4-[(S)-2-methylbutyloxycarbonyl]phenyl}phenyl 2-fluoro-4-decyloxybenzoate, and
4-{4-[(S)-2-methylbutyloxycarbonyl]phenyl}phenyl 2-chloro-4-decyloxybenzoate.

The phase transistion temperatures of these compounds are shown in Table 4.

Example 11

[Synthesis of 4-{4-[-(R)-1-methylpropyloxycarbonyl]phenyl}phenyl 2-fluoro-4-decyloxybenzoate]

4-{4-[-(R)-1-methylpropyloxycarbonyl]phenyl}phenyl 2-fluoro-4-decyloxybenzoate was obtained in the same way as in Example 9 except using 2-fluoro-4-hydroxybenzoic acid chloride instead of 3-fluoro-4-decyloxybenzoic acid chloride. Moreover, 4-{4[(R)-1-methylheptyloxycarbonyl]phenyl}phenyl 2-fluoro-4-decyloxybenzoate was formed as above except using (R)-2-octanol instead of (R)-2-butanol.

The transition temperatures of these compounds are shown in Table 4.

TABLE 4

Transition temperatures (°C.) of (B-2)

| No. | R | X | Q* | C | $S_C*$ | $S_A$ | N* | I |
|---|---|---|---|---|---|---|---|---|
| 1 | $C_{10}H_{21}O$ | F | 2MB* | •63 | •80 | •142 | •150 | • |
| 2 | $C_{14}H_{29}O$ | " | " | •62 | •85.5 | •137 | •138.5 | • |
| 3 | $C_{12}H_{25}O$ | Cl | " | •53.5 | — | •97.5 | •102 | • |
| 4 | $C_{10}H_{21}O$ | F | 2MP | •62 | — | •118 | — | • |
| 5 | " | " | 1MH | •51.5 | — | •108 | — | • |

Example 12

[Synthesis of 2-fluoro-4-{4—(S)-2-methylbutyloxycarbonyl]phenyl}phenol]

Two grams of 3'-fluoro-4'-hydroxybiphenyl-4-carboxylic acid obtained during the procedure of Example 21 to be described later, 4.0 g of (S)-2-methylbutanol and 1.0 g of sulfuric acid were reacted 2-fluoro-4-{4-[-(S)-2-methylbutyloxycarbonyl]phenyl}phenol.

NMR:
δ6.95–8.15 (multiplet 7H, aromatic-H),
δ6.0 (broad singlet 1H, OH), ,
δ4.17 (double doublet 2H, O—CH$_2$—),
δ1.6–2.05 (multiplet 1H, —CH—),
δ1.15–1.55 (multiplet 2H, C—CH$_2$—C),
δ0.85–1.05 (multiplet 6H, —CH$_3$).

Example 13

[Synthesis of 4-{2-fluoro-4—(S)-2-methylbutyloxycarbonyl]phenyl}phenyl-4-decyloxybenzoate]

The procedure of Example 8 was followed except using 4-decyloxybenzoic acid chloride instead of 3-fluoro-dodecyloxybenzoic acid chloride, and 2-fluoro-4-{4—(S)-2-methylbutyloxycarbonyl]phenyl}phenol obtained in Example 12 instead of 4-{4[(S)-2-methylbutyloxycarbonyl]phenyl}phenol, respectively. There resulted 4-{2-fluoro-4—(S)-2-methylbutyloxycarbonyl]phenyl}phenyl 4-decyloxybenzoate.

NMR:
δ6.9–8.3 (multiplet 1H, aromatic H),
δ4.16 (double doublet 2H, COO—CH$_2$—),
δ4.04 (triplet 2H,

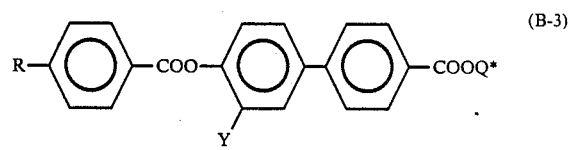

δ1.6–2.0 (multiplet 3H,

δ1.1–1.6 (multiplet 16H, other CH$_2$),
δ0.8–1.05 (m. 9H, —CH$_3$).
Transition temperatures:
I-N* 144.7° C., N*-$S_A$ 113.4° C., $S_{A-SC}$* 95.1° C., m.p. 53.6° C.

The following compounds of formula (B-3) (provided Y is not hydrogen) were formed as above except using 4-octyloxybenzoic acid chloride, 4-dodecyloxybenzoic acid chloride or 4-tetradecyloxybenzoic acid chloride instead of 4-decyloxybenzoic acid chloride.

(B-3)

4-{2-Fluoro-4-[-(S)-2-methylbutyloxycarbonyl]phenyl}phenyl 4-octyloxybenzoate,
4-{2-fluoro-4-[-(S)-2-methylbutyloxycarbonyl]phenyl}phenyl 4-docecyloxybenzoate, and
4-{2-fluoro-4-[-(S)-2-methylbutyloxycarbonyl]phenyl}phenyl 4-tetradecyloxybenzoate.

The transition temperatures of these compounds are shown in Table 5.

TABLE 5

Transition temperatures (°C.) of (B-3)

| No. | R | Y | Q* | C | $S_C*$ | $S_A$ | N* | I |
|---|---|---|---|---|---|---|---|---|
| 1 | $C_8H_{17}O$ | F | 2MB* | •65.5 | •92.4 | — | •144.7 | • |
| 2 | $C_{10}H_{21}O$ | " | " | •53.6 | •95.1 | •113.4 | •139.3 | • |
| 3 | $C_{12}H_{25}O$ | " | " | •56.0 | •91.9 | •119.1 | •133.8 | • |
| 4 | $C_{14}H_{29}O$ | " | " | •57 | •82 | •121.1 | •128.8 | • |

Example 14

[Synthesis of 4-{2-fluoro-4-[-(S)-2-methylbutyloxycarbonyl]phenyl} phenyl 3-fluoro-4-decyloxybenzoate]

The procedure of Example 13 was followed except using 3-fluoro-4-decyloxybenzoic acid chloride instead of 4-decyloxybenzoic acid chloride. There resulted 4-{2-fluoro-4-[-(S)-2-methylbutyloxycarbonyl]phenyl}phenyl-3-fluoro-4-decyloxybenzoate].

NMR:
δ6.9–8.3 (multiplet 10H, aromatic-H),
δ4.15 (double doublet 2H, COOCH$_2$—),
δ4.05 (triplet 2H,

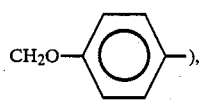

δ1.6–2.0 (multiplet 3H,

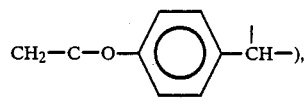

δ1.1–1.6 (multiplet 16H, other CH$_2$),
δ0.8–1.05 (m. 9H, —CH$_3$).
Transition temperatures:
I-N* 124.8° C., N*-S$_A$ 106.7° C., S$_A$-S$_C$* 102.3° C., m.p. 57.0° C.

The following compounds of formula (B-4) (provided X and Y are not hydrogens) were obtained as above except using 3-fluoro-4-octyloxybenzoic acid chloride, 3-fluoro-4-dodecyloxybenzoic acid chloride or 3-fluoro-4-tetradecyloxybenzoic acid chloride instead of of 3-fluoro-4-decyloxybenzoic acid chloride.

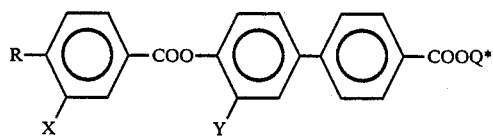

4-{2-Fluoro-4-[-(S)-2-methylbutyloxycarbonyl]-phenyl}phenyl 3-fluoro-4-octyloxybenzoate,
4-{2-fluoro-4-[-(S)-2-methylbutyloxycarbonyl]-phenyl}phenyl 3-fluoro-4-docecyloxybenzoate, and
4-{2-fluoro-4-[-(S)-2-methylbutyloxycarbonyl]-phenyl}phenyl 3-fluoro-4-tetradecyloxybenzoate.

The transition temperatures of these compounds are shown in Table 6.

TABLE 6

Transition temperatures (°C.) of

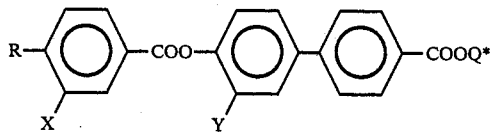

| No. | R | X | Y | Q* | C | S$_C$* | S$_A$ | N* | I |
|---|---|---|---|---|---|---|---|---|---|
| 1 | C$_8$H$_{17}$O | F | F | 2MB* | •64.4 | •100.0 | — | •128.7 | • |
| 2 | C$_{10}$H$_{21}$O | " | " | " | •57.0 | •102.3 | •106.7 | •124.8 | • |
| 3 | C$_{12}$H$_{25}$O | " | " | " | •56.3 | •98.4 | •112.2 | •120.2 | • |
| 4 | C$_{14}$H$_{29}$O | " | " | " | •60.5 | •96.9 | •113.9 | •117.4 | • |

Example 15
[Synthesis of 3-chloro-4-[-(S)-2-methylbutyloxycarbonyl]phenyl 4'-decyloxybiphenyl-4-carboxylate]

The procedure of Example 1 was repeated except using 4'-decyloxybiphenyl-4-carboxylic acid instead of 4-tetradecyloxybenzoic acid. There was obtained 3-chloro-4-[-(S)-2-methylbutyloxycarbonyl]phenyl 4'-decyloxybiphenyl-4-carboxylate.
NMR:

δ6.9–8.2 (multiplet 11H, aromatic-H),
δ4.16 (double doublet 2H, COO—CH$_2$—),
δ3.96 (triplet 2H,

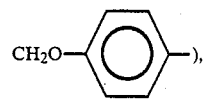

δ1.6–2.0 (multiplet 3H, CH$_2$—C—O—o—, and

δ1.2–1.6 (multiplet 16H, other CH$_2$),
δ0.85–1.05 (multiplet 9H, —CH$_3$).
IR: 1725, 1605, 1400, 1295, 1205, 1120, 1075, 835, 775, 700 (cm$^{-1}$).
MS: M/e=578,580 (P+).
Transition temperatures:
S$_A$-I 151° C., S$_C$*-S$_A$ 116° C., m.p. 33.5° C.

The following compounds of formula (C-1) (provided Y is not hydrogen) were formed as above except using 4'-octyloxybiphenyl-4-carboxylic acid, 4'-dodecyloxybiphenyl-4-carboxylic acid, 4'-tetradecyloxybiphenyl-4-carboxylic acid, 4'-hexadecyloxybiphenyl-4-carboxylic acid or 4'-dodecylbiphenyl-4-carboxylic acid instead of said 4'-decyloxybiphenyl-4-carboxylic acid, and (S)-2-methylbutyl-2-fluoro-4-hydroxybenzoate instead of said (S)-2-methylbutyl-2-chloro-4-hydroxybenzoate, respectively.

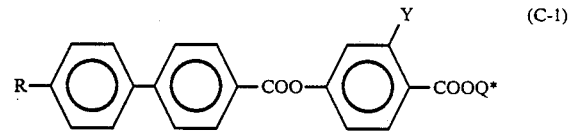

3-Chloro-4-[-(S)-2-methylbutyloxycarbonyl]phenyl 4'-octyloxybiphenyl-4-carboxylate,
3-chloro-4-[-(S)-2-methylbutyloxycarbonyl]phenyl 4'-dodecyloxybiphenyl-4-carboxylate,
3-chloro-4-[-(S)-2-methylbutyloxycarbonyl]phenyl 4'-tetradecyloxybiphenyl-4-carboxylate,
3-fluoro-4-[-(S)-2-methylbutyloxycarbonyl]phenyl 4'-octyloxybiphenyl-4-carboxylate,
3-fluoro-4-[-(S)-2-methylbutyloxycarbonyl]phenyl 4'-decyloxybiphenyl-4-carboxylate,
3-fluoro-4-[-(S)-2-methylbutyloxycarbonyl]phenyl 4'-dodecyloxybiphenyl-4-carboxylate,
3-fluoro-4-[-(S)-2-methylbutyloxycarbonyl]phenyl 4'-tetradecyloxybiphenyl-4-carboxylate,
3-fluoro-4-[-(S)-2-methylbutyloxycarbonyl]phenyl 4'-hexadecyloxybiphenyl-4-carboxylate,
3-chloro-4-[-(S)-2-methylbutyloxycarbonyl]phenyl 4'-dodecylbiphenyl-4-carboxylate, and
3-fluoro-4-[-(S)-2-methylbutyloxycarbonyl]phenyl 4'-dodecylbiphenyl-4-carboxylate.

The transition temperatures these compounds are shown in Table 7.

Example 16

[Synthesis of 3-fluoro-4-[-(R)-1-methylpropyloxycarbonyl]phenyl-4'-decyloxybiphenyl-4-carboxylate]

The procedure of Example 2 was repeated except using 4'-decyloxybiphenyl-4-carboxylic acid instead of 4-octyloxybenzoic acid chloride to obtain 2-fluoro-4-{4—4-octyloxyphenyl]benzoyloxy}benzoic acid as an intermediate and 3-fluoro-4—(R)-1-methylpropyloxycarbonyl]phenyl 4'-decyloxybiphenyl-4-carboxylate].

3-Fluoro-4-[-(R)-1-methylheptyloxycarbonyl]phenyl-4'-decyloxybiphenyl-4-carboxylate was obtained as above except using (R)-2-0ctanol instead of (R)-2-butanol.

The transition temperatures of these compounds are shown in Table 7.

TABLE 7

Transition temperature (°C.) of (C-1)

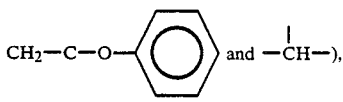

| No. | R | Y | Q* | C | Sm | $S_C$* | $S_A$ | I |
|---|---|---|---|---|---|---|---|---|
| 1 | $C_8H_{17}O$ | Cl | 2MB* | •47 | — | •116.5 | •157 | • |
| 2 | $C_{10}H_{21}O$ | " | " | •33.5 | — | •116 | •151 | • |
| 3 | $C_{12}H_{25}O$ | " | " | •41 | — | •115.5 | •150 | • |
| 4 | $C_{14}H_{29}O$ | " | " | •39.5 | — | •108.5 | •145 | • |
| 5 | $C_8H_{17}O$ | F | " | •58.5 | — | •140 | •182 | • |
| 6 | $C_{10}H_{21}O$ | " | " | •58 | — | •144 | •179 | • |
| 7 | $C_{12}H_{25}O$ | " | " | •46.5 | — | •138 | •174 | • |
| 8 | $C_{14}H_{29}O$ | " | " | •42.5 | — | •131 | •169 | • |
| 9 | $C_{16}H_{33}O$ | " | " | •76 | — | •82.5 | •155 | • |
| 10 | $C_{12}H_{25}O$ | Cl | " | •39.5 | — | •73 | •116 | • |
| 11 | " | F | " | •38.5 | — | •92 | •138 | • |
| 12 | $C_{10}H_{21}O$ | " | 1MP | •* | SmI** •105.5 | •120.5 | •160 | • |
| 13 | " | " | 1MH | •* | SmII** •106.8 SmI*** •107.5 | •110 | •134 | • |

*The melting point is unknown because the compound did not crystallize.
 and * Smectic phases closer to the crystaslline phase.
SmI is considered a $S_F$* phase.

Example 17

[Synthesis of 2-fluoro-4-[-(S)-2-methylbutyloxycarbonyl)phenyl 4'-dodecyloxybiphenyl-4-carboxylate]

The procedure of Example 15 was repeated except using 4'-dodecyloxybiphenyl-4-carboxylic acid instead of 4'-decyloxybiphenyl-4-carboxylic acid and (S)-2-methylbutyl 3-fluoro-4-hydroxybenzoate instead of (S)-2-methylbutyl 2-chloro-4-hydroxybenzoate, respectively. There was obtained 2-fluoro-4[(S)-2-methylbutyloxycarbonyl]phenyl-4'-dodecyloxybiphenyl-4-carboxylate.

NMR:
δ6.9–8.2 (multiplet 11H, aromatic),
δ4.15 (double doublet 2H, COOCH₂—),
δ4.00 (triplet 2H,

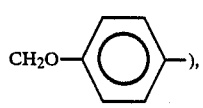

δ1.6–2.0 (multiplet 3H,

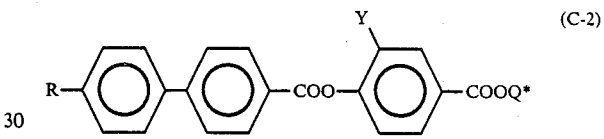

δ1.2–1.5 (multiplet 20H, other CH₂),
δ0.85–1.1 (multiplet 9H, CH₃).
IR: 1735, 1720, 1600, 1295, 1190, 1110, 1070, 830, 760 (cm⁻¹).
MS: M/e=590 (P+).
Transition temperatures:
I-$S_A$ 131° C., $S_A$-$S_C$* 62.5° C., $S_C$*-$S_m$* 54° C., m.p. 50° C.

The following compounds of formula (C-2) (provided Y is not hydrogen) were obtained as above except using 4'-octyloxybiphenyl-4-carboxylic acid or 4'-hexadecyloxybiphenyl-4-carboxylic acid instead of 4'-dodecyloxybiphenyl-4-carboxylic acid, and (S)-2-methylbutyl 3-chloro-4-hydroxybenzoate instead of (S)-2-methylbutyl 3-fluoro-4-hydroxybenzoate, respectively.

2-Fluoro-4-[-(S)-2-methylbutyloxycarbonyl]phenyl-4-'octyloxybiphenyl-4-carboxylate, 2-fluoro-4-[-(S)-2-methylbutyloxycarbonyl]phenyl-4-'hexadecyloxybiphenyl-4-carboxylate, and 2-chloro-4-[-(S)-2-methylbutyloxycarbonyl]phenyl-4-'hexadecyloxybiphenyl-4-carboxylate.

The transition temperatures of these compounds are shown in Table 8.

TABLE 8

Transition temperatures (°C.) of (C-2)

| No. | R | Y | Q* | C | Sm | $S_C$* | $S_A$ | I |
|---|---|---|---|---|---|---|---|---|
| 1 | $C_8H_{17}O$ | F | 2MB* | •57 | — | — | •141 | • |
| 2 | $C_{12}H_{25}O$ | " | " | •50 | •54 | •62.5 | •131 | • |
| 3 | $C_{16}H_{33}O$ | " | " | •67 | •60 | •77 | •133 | • |
| 4 | $C_{16}H_{33}O$ | Cl | " | •51 | — | — | •116.3 | • |

Example 18

[Synthesis of 4-[-(S)-2-methylbutyloxycarbonyl]phenyl 3'-nitro-4'-tetradecyloxybiphenyl-4-carboxylate]

The procedure of Example 1 was followed except using 3'-nitro-4'-tetradecyloxybiphenyl-4-carboxylic acid instead of said 4-tetradecyloxybenzoic acid and (S)-2-methylbutyl 4-hydroxybenzoate instead of said (S)-2-methylbutyl 2-chloro-4-hydroxybenzoate. There resulted 4-[-(S)-2-methylbutyloxycarbonyl]phenyl 3'-nitro-4'-tetradecyloxybiphenyl-4-carboxylate].

NMR:
δ7.1–8.4 (multiplet 11H, aromatic-H),

δ4.05–4.3 (multiplet 4H,

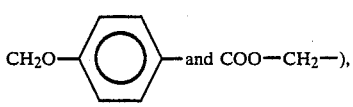

δ1.6–2.1 (multiplet 3H,

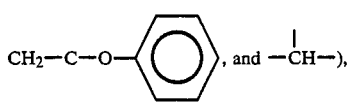

δ1.2–1.5 (multiplet 24h, other CH₂),
δ0.8–1.1 (multiplet 9H, CH₃).
IR: 1740, 1710, 1610, 1545, 1270, 1215, 1080, 770, 700 (cm⁻¹).
Transition temperatures:
$S_A$-I 145° C., $S_A$-$S_C$* 85.0° C., m.p. 41.5° C.

The following compounds of formula (C-3) (provided X is not hydrogen) were obtained as above except using 3'-nitro-4'-octyloxybiphenyl-4-carboxylic acid, 3'-nitro-4'-hexadecyloxybiphenyl-4-carboxylic acid, 3'-chloro-4'-octyloxybiphenyl-4-carboxylic acid, 3'-chloro-4'-hexadecyloxybiphenyl-4-carboxylic acid, 3'-fluoro-4'-octyloxybiphenyl-4-carboxylic acid or 3'-fluoro-4'-decyloxybiphenyl-4-carboxylic acid instead of said 3'-nitro-4'-tetradecyloxybiphenyl-4-carboxylic acid.

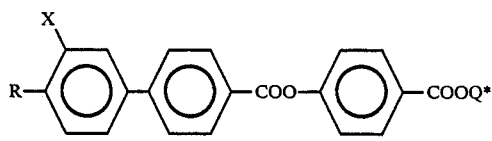

4-[(S)-2-Methylbutyloxycarbonyl]phenyl 3'-nitro-4'-octyloxybiphenyl-4-carboxylate, 4-[(S)-2-methylbutyloxycarbonyl]phenyl 3'-nitro-4'-hexadecyloxybiphenyl-4-carboxylate, 4-[(S)-2-methylbutyloxycarbonyl]phenyl 3'-chloro-4'-octyloxybiphenyl-4-carboxylate, 4-[(S)-2-methylbutyloxycarbonyl]phenyl 3'-chloro-4'-hexadecyloxybiphenyl-4-carboxylate, 4-[(S)-2-methylbutyloxycarbonyl]phenyl 3'-fluoro-4'-octyloxybiphenyl-4-carboxylate, and 4-[(S)-2-methylbutyloxycarbonyl]phenyl 3'-fluoro-4'-decyloxybiphenyl-4-carboxylate.

The transition temperatures of these compounds are shown in Table 9.

TABLE 9

Transition temperatures (°C.) of

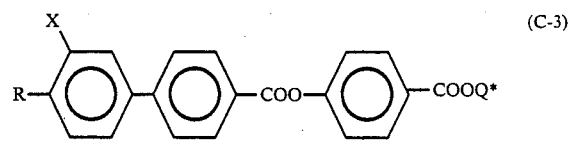

| No. | R | X | Q* | C | $S_C$* | $S_A$ | I |
|---|---|---|---|---|---|---|---|
| 1 | C₈H₁₇O | NO₂ | 2MB* | •48 | •103 | •146 | • |
| 2 | C₁₂H₂₅O | " | " | •45.5 | •89.5 | •146.5 | • |
| 3 | C₁₄H₂₉O | " | " | •41.5 | •85 | •145 | • |
| 4 | C₈H₁₇O | Cl | " | •50.5 | •99 | •146 | • |
| 5 | C₁₆H₃₃O | " | " | •56 | — | — | • |

TABLE 9-continued

Transition temperatures (°C.) of

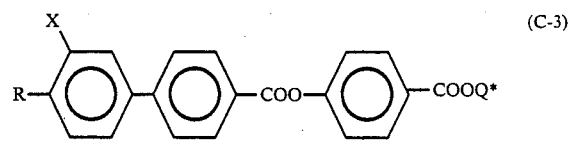

| No. | R | X | Q* | C | $S_C$* | $S_A$ | I |
|---|---|---|---|---|---|---|---|
| 6 | C₈H₁₇O | F | " | •62 | •124.7 | •170.7 | • |
| 7 | C₁₀H₂₁O | " | " | •54 | •124.2 | •165.6 | • |

Example 19

[Synthesis of 2-fluoro-4-[(S)-2-methylbutyloxycarbonyl]phenyl 3'-chloro-4'-octyloxybiphenyl-4-carboxylate]

The reaction was performed as in Example 18 except using 3'-chloro-4'-octyloxybiphenyl-4-carboxylic acid instead of 3'-nitro-4'-tetradecyloxybiphenyl-4-carboxylic acid and (S)-2-methylbutyl 3-fluoro-4-hydroxybenzoate instead of (S)-2-methylbutyl 4-hydroxybenzoate. There was obtained 2-fluoro-4-[(S)-2-methylbutyloxycarbonyl]phenyl 3'-chloro-4'-octyloxybiphenyl-4-carboxylate.

NMR:
δ6.9–8.3 (multiplet 10H, aromatic),
δ4.18 (double doublet 2H, COOCH₂),
δ4.06 (triplet 2H,

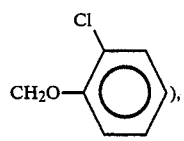

δ1.7–2.0 (multiplet 3H,

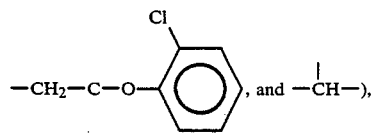

δ1.2–1.6 (multiplet 12H, other —CH₂),
δ0.8–1.1 (multiplet 9H, CH₃).
MS: M/e=586, 588 (P+).
Transition temperatures:
N*-I 114° C., N*-$S_A$ 106° C., $S_A$-$S_C$* 71° C., m.p. 42.5° C.

The following compounds of formula (C-4) (provided X and Y are not hydrogens) were formed as above except using 3'-chloro-4'-hexadecyloxybiphenyl-4-carboxylic acid, 3'-nitro-4'-dodecyloxybiphenyl-4-carboxylic acid, 3'-fluoro-4'-octyloxybiphenyl-4-carboxylic acid, 3'-fluoro-4'-decyloxybiphenyl-4-carboxylic acid, 3'-fluoro-4'-dodecyloxybiphenyl-4-carboxylic acid or 3'-fluoro-4'-tetradecyloxybiphenyl-4-carboxylic acid instead of 3'-chloro-4'-octyloxybiphenyl-4-carboxylic acid, and (S)-2-methylbutyl 3-chloro-4-hydroxybenzoate instead of (S)-2-methylbutyl 3-fluoro-4-hydroxybenzoate, respectively.

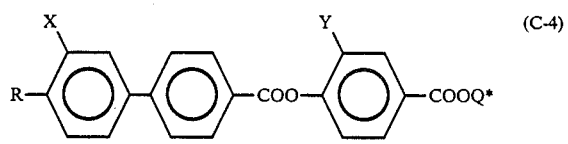 (C-4)

2-Chloro-4-[(S)-2-methylbutyloxycarbonyl]phenyl 3'-chloro-4'-hexadecyloxybiphenyl-4-carboxylate,
2-chloro-4-[(S)-2-methylbutyloxycarbonyl]phenyl 3'-nitro-4'-dodecyloxybiphenyl-4-carboxylate,
2-fluoro-4-[(S)-2-methylbutyloxycarbonyl]phenyl 3'-nitro-4'-dodecyloxybiphenyl-4-carboxylate,
2-fluoro-4-[(S)-2-methylbutyloxycarbonyl]phenyl 3'-fluoro-4'-octyloxybiphenyl-4-carboxylate,
2-fluoro-4-[(S)-2-methylbutyloxycarbonyl]phenyl 3'-fluoro-4'-decyloxybiphenyl-4-carboxylate,
2-fluoro-4-[(S)-2-methylbutyloxycarbonyl]phenyl 3'-fluoro-4'-dodecyloxybiphenyl-4-carboxylate,
2-fluoro-4-[(S)-2-methylbutyloxycarbonyl]phenyl 3'-fluoro-4'-tetradecyloxybiphenyl-4-carboxylate.

The transition temperatures of these compounds are shown in Table 10.

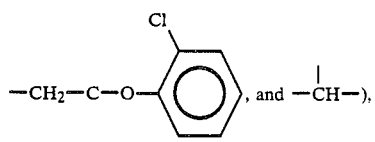, and —CH—),

δ1.2–1.6 (multiplet 12H, other CH₂),
δ0.85–1.15 (multiplet 9H, CH₃).
MS: M/e=586.588 (P⁺)
Transition temperatures:
$S_A$-I 145° C., $S_A$-$S_C{}^*$ 98.5° C.,
m.p. 40° C.

The following compounds of formula (C-5) (provided X and Y are not hydrogens) were obtained as above except using 3'-chloro-4'-hexadecyloxybiphenyl-4-carboxylic acid, 3'-nitro-4'-octyloxybiphenyl-4-carboxylic acid or 3'-nitro-4'-dodecyloxybiphenyl-4-carboxylic acid instead of 3'-chloro-4'-octyloxybiphenyl-4-carboxylic acid, and (S)-2-methylbutyl-2-chloro-4-hydroxybenzoate instead of (S)-2-methylbutyl-2-fluoro-4-hydroxybenzoate, respectively.

TABLE 10

Transition temperature (°C.) of (C-4)

| No. | R | X | Y | Q* | C | $S_C{}^*$ | $S_A$ | N* | I |
|---|---|---|---|---|---|---|---|---|---|
| 1 | C₈H₁₇O | Cl | F | 2MB* | •42.5 | •71 | •106 | •114 | • |
| 2 | C₁₆H₃₃O | Cl | Cl | " | •62 | — | •83 | — | • |
| 3 | C₁₂H₂₅O | NO₂ | Cl | " | •88 | — | •105 | — | • |
| 4 | C₁₂H₂₅O | NO₂ | F | " | •58 | — | •123.7 | — | • |
| 5 | C₈H₁₇O | F | F | " | •49.3 | •75.3 | •133.0 | •135.7 | • |
| 6 | C₁₀H₂₁O | " | " | " | •55.7 | •77.3 | •130.8 | — | • |
| 7 | C₁₂H₂₅O | " | " | " | •49.1 | •69.5 | •129.8 | — | • |
| 8 | C₁₄H₂₉O | " | " | " | •43.7 | •70.2 | •126.9 | — | • |

Example 20

[Synthesis of 3-fluoro-4-[(S)-2-methylbutyloxycarbonyl]phenyl-3'-chloro-4'-octyloxybiphenyl-4-carboxylate]

The reaction was carried out as in Example 19 except using (S)-2-methylbutyl-2-fluoro-4-hydroxybenzoate instead of (S)-2-methylbutyl-3-fluoro-4-hydroxybenzoate. There resulted 3-fluoro-4-[(S)-2-methylbutyloxycarbonyl]phenyl-3'-chloro-4'-octyloxybiphenyl-4-carboxylate.

NMR:
δ6.9–8.3 (multiplet 10H, aromatic),
δ4.18 (double doublet 2H, COOCH₂),
δ4.05 (triplet 2H,

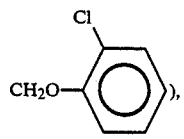

δ1.6–2.0 (multiplet 3H,

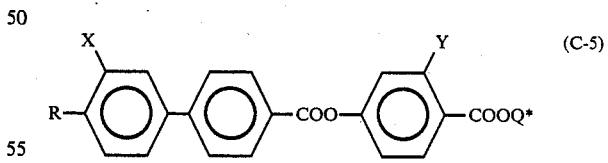 (C-5)

3-Fluoro-4-[(S)-2-methylbutyloxycarbonyl]phenyl 3'-chloro-4'-hexadecyloxybiphenyl-4-carboxylate,
3-chloro-4-[(S)-2-methylbutyloxycarbonyl]phenyl 3'-chloro-4'-octyloxybiphenyl-4-carboxylate,
3-fluoro-4-[(S)-2-methylbutyloxycarbonyl]phenyl 3'-nitro-4'-dodecyloxybiphenyl-4-carboxylate,
3-chloro-4-[(S)-2-methylbutyloxycarbonyl]phenyl 3'-nitro-4'-octyloxybiphenyl-4-carboxylate, and
3-chloro-4-[(S)-2-methylbutyloxycarbonyl]phenyl 3'-nitro-4'-dodecyloxybiphenyl-4-carboxylate.

The transition temperatures of these compounds are shown in Table 11.

TABLE 11

Transition temperatures (°C.) of (C-5)

R—⟨⟩—⟨⟩(X)—COO—⟨⟩(Y)—COOQ*

| No. | R | X | Y | Q* | C | S$_C$ | S$_A$ | I |
|---|---|---|---|---|---|---|---|---|
| 1 | C$_8$H$_{17}$O | Cl | F | 2MB | •40 | •98.5 | •145 | • |
| 2 | C$_{16}$H$_{33}$O | Cl | F | 2MB | •53.5 | (•45.6) | •130 | • |
| 3 | C$_8$H$_{17}$O | Cl | Cl | 2MB | •73 | (•55.8) | •109 | • |
| 4 | C$_{12}$H$_{25}$O | NO$_2$ | F | 2MB | * | •108 | •143 | • |
| 5 | C$_8$H$_{17}$O | NO$_2$ | Cl | 2MB | •69.5 | •72.7 | •112 | • |
| 6 | C$_{12}$H$_{25}$O | NO$_2$ | Cl | 2MB | •64.5 | •89.8 | •123 | • |

*The melting point is unknown because the compound did not crystallize.

Example 21

[Synthesis of 3'-fluoro-4'-dodecyloxybiphenyl-4-carboxylic acid]

2-Fluoroanisole (266 g) was dissolved in 700 ml of chloroform and 337 g of bromine was added dropwise to the solution. The mixture was reacted under reflux at 67° to 68° C. for 1 hour, subsequently left to cool, washed with a 5% aqueous solution of sodium hydroxide and then with water, and dried with anhydrous sodium sulfate. After the solvent was distilled off under reduced pressure, the residue was distilled (95° to 96° C./12 mmHg) to obtain 317 g of 4-bromo-2-fluoroanisole (yield 73.4%).

Forty-one grams of said anisole was dissolved in 100 ml of tetrahydrofuran, and the solution was added dropwise to a suspension comprising 5.3 g of magnesium turnings and 60 ml of tetrahydrofuran at such speed that the solvent was slowly refluxed. After the addition, the mixture was further refluxed on heating for 1 hour. After the reaction mixture was left to cool, 41 g of iodobenzene in 100 ml of tetrahydrofuran and 300 mg of palladium chloride were added, and the mixture was reacted at 70° C. for 2 hours. After tetrahydrofuran was distilled off, 5 of ethyl acetate was added, and the resulting mixture was washed with 10% hydrochloric acid solution and then with water, and dried with anhydrous sodium sulfate. After the solvent was distilled off, the resulting crude crystals were extracted with n-pentane using a Soxhlet extractor to afford 19.3 g of 3-fluoro-4-methoxybiphenyl (yield 52%). The unextracted residue was 3,3'-difluoro-4,4'-dimethoxybiphenyl, a homocoupling substance.

Three grams of said 3-fluoro-4-methoxybiphenyl was dissolved in 14 ml of carbon disulfide, and 1.17 g of acetyl chloride and 2.36 g of aluminum chloride were added, followed by stirring the mixture for 10 hours. Twenty milliliters of 10% hydrochloric acid and then 5 ml of water were added, and the precipitate was filtered and washed with water. The resulting crude crystals were recrystallized from ethanol to obtain 2.75 g of 3'-fluoro-4'-methoxy-4-acetylbiphenyl (yield 76%).

The whole amount of said acetylbiphenyl was dissolved in 60 ml of dioxane, and an aqueous solution of sodium hypobromite formed at −7° to −9° C. from 55 ml of a 16.5% aqueous solution of sodium hydroxide and 10.4 g of bromine was added dropwise to the solution over the course of 90 minutes.

After the oxidizing agent was decomposed with sodium bisulfite, dioxane was distilled off under reduced presure, and the residue was further stirred with the addition of 10% hydrochloric acid. The precipitate was separated by filtration and then recrystallized from ethanol to obtain 2.58 g of 3'-fluoro-4'-methoxybiphenyl-4-carboxylic acid (yield 93.2%).

The whole amount of said carboxylic acid was added to 100 ml of acetic acid, and 21 ml of 60% hydrobromic acid was added. The mixture was reacted for 15 hours under reflux. The reaction mixture was left to cool, 250 ml of water was added at 70° to 80° C., and the mixture was further left to cool up to room temperature. The precipitated crystals were filtered and washed with water to afford 1.92 g of 3'-fluoro-4'-hydroxybiphenyl-4-carboxylic acid (yield 78.9%).

Said carboxylic acid (1.5 g) and 1.95 g of dodecyl bromide were added to 14 ml of ethanol and 6 ml of water, and 0.52 g of sodium hydroxide was further added. The mixture was refluxed for 7 hours on heating. After the reaction mixture was left to cool, it was neutralized with 20% hydrochloric acid, extracted with methylene chloride and concentrated. The resulting crude crystals were recrystallized from ethanol to obtain 1.0 g of 3'-fluoro-4'-dodecyloxybiphenyl-4-carboxylic acid (yield 40.2%).

The product was liquid crystalline and had the melting point (C-S point) of 99° C. and the S-I point of 182° C.

3'-Fluoro-4'-octyloxybiphenyl-4-carboxylic acid, 3'-fluoro-4'-decyloxybiphenyl-4-carboxylic acid, 3'-fluoro-4'-tetradecyloxybiphenyl-4-carboxylic acid and 3'-fluoro-4'-hexadecyloxybiphenyl-4-carboxylic acid were obtained as above except using octyl bromide, decyl bromide, tetradecyl bromide or hexadecyl bromide instead of said dodecylbromide.

Example 22

[Blending with a known ferroelectric liquid crystal]

A liquid crystalline composition was prepared by blending 10 parts of 3-fluoro-4-[(S)-2-methylbutyloxycarbonyl]phenyl 4-dodecyloxybenzoate obtained in Example 1 with 20 parts of DOBAMBC ((S)-2-methylbutyl p-decyloxycarbonylbenzylideneaminocinnamate) known as a S$_C$* liquid crystal. When the transition temperatures of the mixed liquid crystals were measured, the temperature range in which to show the S$_C$* phase was 43° to 2° C. at the time of cooling and therefore could be notably decreased as compared to 92° to 63° C. (m.p. 76° C.) shown in case of using DOBAMBC alone. This composition was left to cool below 0° C. and crystallized. The melting point thereof was then measured and found to be 30° C.

Example 23

[Preparation of a liquid crystalline composition showing the S$_C$* phase near room temperature by blending two components]

A liquid crystalline composition was prepared by blending 60 parts of 2-fluoro-4-[(S)-2-methylbutyloxycarbonylphenyl 3'-chloro-4'-octyloxybiphenyl-4-carboxylate obtained in Example 19 with 10 parts of 3-fluoro-4-[(S)-2-methylbutyloxycarbonyl]phenyl 4-dodecyloxybenzoate obtained in Example 1. This composition showed the S$_C$* phase at 59.5° C. or lower and kept said phase below 0° C. Said composition had the S$_A$-N* point of 102° C. and the N*-I point of 109.5° C.

Example 24

[Preparation of a mixed liquid crystalline composition showing the $S_C^*$ phase near room temperature by blending two components]

A liquid crystalline composition was prepared by blending 50 parts of 3-fluoro-4-[-(S)-2-methylbutyloxycarbonyl]phenyl 4'-octyloxybiphenyl-4-carboxylate obtained in Example 15 with 50 parts of 3-fluoro-4-[-(S)-2-methylbutyloxycarbonyl]phenyl-4-octyloxybenzoate obtained in Example 1. This composition showed the $S_C^*$ phase at 57° C. or lower and kept said phase below 0° C. Said composition was left to stand at −15° C. or lower for a long period of time and crystallized. The melting point thereof was then measured and found to be about 5° C. The $S_A$-I point of this composition was 104° C.

Example 25

[Preparation of a liquid crystalline composition showing the $S_C^*$ phase near room temperature by blending many components]

A liquid crystalline composition was prepared by blending 63 parts of 3-fluoro-4-[-(S)-2-methylbutyloxycarbonyl]phenyl 4'-decyloxybiphenyl-4-carboxylate and 63 parts of 3-chloro-4-[-(S)-2-methylbutyloxycarbonyl]phenyl 4'-octyloxybiphenyl-4-carboxylate both obtained in Example 15, 62 parts of 4-[-(S)-2-methylbutyloxycarbonyl]phenyl 3'-chloro-4'-octyloxybiphenyl-4-carboxylate obtained in Example 18, 62 parts of 4-{4-[-(S)-2-methylbutyloxycarbonyl]phenyl}phenyl 3-fluoro-4-decyloxybenzoate and 19 parts of 4-{4-[-(S)-2-methylbutyloxycarbonyl]phenyl}phenyl 3-chloro-4-decyloxybenzoate both obtained in Example 8, and 17 parts of 4-{4-[-(S)-2-methylbutyloxycarbonyl]phenyl}phenyl 2-fluoro-4-decyloxybenzoate obtained in Example 10. This composition showed the $S_C^*$ phase from 108° C. at the time of cooling and kept said phase in the wide temperature range up to 0° C. or lower. The SA-I point of this composition was 157° C.

Example 26

[Production of a liquid crystal display element]

4-{4-[-(S)-2-methlbutyloxycarbonyl]phenyl}phenyl 3-fluoro-4-octyloxybenzoate obtained in Example 8 was heated at 160° C. to form an isotropic liquid. This liquid was filled between two glass transparent electrodes with a 3 micrometer-think spacer interposed, said electrodes resulting from polyimide coating and aligning treatment such as rubbing. Thus, there was obtained a thin film cell. Said cell was progressively cooled at a rate of 5° C. per minute to align the smectic phase, thereby obtaining a uniform monodomain. The cell was cooled to the $S_C^*$ phase of 118° C. or lower. An electric field (20 V, 50 Hz rectangular wave) was applied at 102° C. When the light switching action thereof was measured by a photo-multiplier it was found to be about 100 μsec. This means that said liquid crystal display element responded at high speed.

A triangular wave was applied to the cell at the same temperature (102° C.), and the spontaneous polarization thereof was measured from the polarization realignment current that occurred. It was found to be 2.24 nC/cm². At 64° C., it was 4.59 nC/cm².

Example 27

[Production of a liquid crystal display cell that operates at room temperature]

The composition afforded in Example 25 was formed into a monodomain thin film cell in the same way as in Example 26.

Said cell was cooled to 24.1° C., an electric field (20 V, 50 Hz rectangular wave) was applied thereto and the speed of response was measured. It was found to be 1300 μsec. This means that the liquid crystal display cell responded at high speed.

What we claim is:

1. A liquid crystalline compound of formula (I)

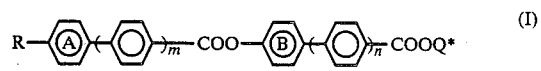

wherein
R denotes an alkyl or alkoxy group having 6 to 18 carbon atoms,

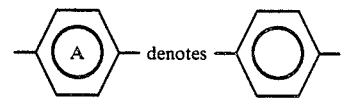

m is 1, n is 0,

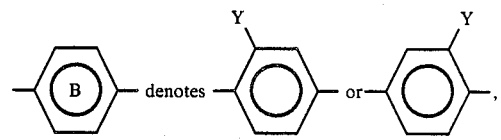

Y denotes fluorine or chlorine, and
Q* denotes an optically active allkyl group having an asymmetric carbon atom including

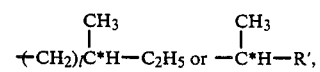

wherein
l is an integer of 1-3,
R' denotes an alkyl group having 2 to 8 carbon atoms, and
C* denotes an asymmetrical carbon atom.

2. The liquid crystalline compound of claim 1 wherein in formula (I) R is an alkoxy group having 6 to 18 carbon atoms.

3. The liquid crystalline compound of claim 2 wherein in formula (I) Y is fluorine.

4. The liquid crystalline compound of claim 3 wherein in formula (I) Q* is an optically active 2-methylbutyl, 3-methylphenyl, 1-methylpropyl or 1-methylheptyl group.

5. A liquid crystalline composition comprising a mixture of at least one of the compounds of formula (I) as set forth in claim 1 and at least one other liquid crystalline compound.

6. The liquid crystalline composition of claim 5 having a chiral smectic C phase.

7. A liquid crystalline composition comprising a mixture of at least one of the compounds of formula (I) as set forth in claim 2 and at least one other liquid crystalline compound.

8. The liquid crystalline composition of claim 7 having chiral smectic C phase.

9. A liquid crystalline composition comprising a mixture of at least one of the compounds of formula (I) as set forth in claim 3 and at least one other liquid crystalline compound.

10. The liquid crystalline composition of claim 9 having a chiral smectic C phase.

11. A liquid crystalline composition comprising a mixture of at least one of the compounds of formula (I) as set forth in claim 4 and at least one other liquid crystalline compound.

12. The liquid crystalline composition of claim 11 having a chiral smectic C phase.

13. The liquid crystalline composition of claim 5 wherein said at least one other liquid crystalline compound comprises ((S)-2-methylbutyl p-decyloxycarbonylbenzylideneaminocinnamate).

14. A liquid crystalline composition comprising a mixture of at least two of the compounds of formula (I) as set forth in claim 1.

15. The liquid crystalline composition of claim 14 having a chiral smectic C phase.

16. The liquid crystalline composition of claim 15 wherein in at least one of the compounds of formula (I) R is an alkoxy group having 6 to 18 carbon atoms.

17. The liquid crystalline composition of claim 15 wherein in at least one of the compounds of formula (I) Y is fluorine.

18. The liquid crystalline composition of claim 15 wherein in at least one of the compounds of formula (I) Q* is an optically active 2-methylbutyl, 3-methylpentyl, 1-methylpropyl or 1-methylheptyl group.

19. The liquid crystalline composition of claim 9 having a chiral smectic C phase near room temperature comprising a mixture of 3-fluoro-4-[(S)-2-methylbutyloxycarbonyl]phenyl 4'-octyloxybiphenyl-4-carboxylate and 3-fluoro-4-[(S)-2-methylbutyloxycarbonyl]phenyl-4-octyloxybenzoate.

20. The liquid crystalline composition of claim 14 having a chiral smectic C phase near room temperature comprising a mixture of 3-fluoro-4-[(S)-2-methylbutyloxycarbonyl]phenyl 4'-decyloxybiphenyl-4-carboxylate, 3-chloro-4-[(S)-2-methylbutyloxycarbonyl]phenyl 4'-octyloxybiphenyl-4-carboxylate, 4-[(S)-2-methylbutyloxycarbonyl]phenyl 3'-chloro-4'-octyloxybiphenyl-4-carboxylate, 4{4-[(S)-2-methylbutyloxycarbonyl]phenyl}phenyl 3-fluoro-4-decyloxybenzoate, 4-{4-[(S)-2-methylbutyloxycarbonyl]phenyl} 3-chloro-4-decyloxybenzoate, and 4-{4-[(S)-2-methylbutyloxycarbonyl]phenyl}phenyl 2-fluoro-4-decyloxybenzoate.

21. In a liquid crystal display cell having a thin film of a liquid crystalline composition sandwiched between two transparent electrodes the improvement wherein the liquid crystalline composition comprises at least one liquid crystalline compound of formula (I) as set forth in claim 1.

* * * * *

UNITED STATES PATENT AND TRADEMARK OFFICE
CERTIFICATE OF CORRECTION

PATENT NO. : 4,828,754
DATED : May 9, 1989
INVENTOR(S) : SADAO TAKEHARA ET AL.

It is certified that error appears in the above-identified patent and that said Letters Patent is hereby corrected as shown below:

Claim 1, line 10 of the claim, "allkyl" should read --alkyl--.

Claim 4, line 3 of the claim, "3-methylphenyl" should read --3-methylpentyl--.

Signed and Sealed this

Sixth Day of March, 1990

Attest:

JEFFREY M. SAMUELS

Attesting Officer

Acting Commissioner of Patents and Trademarks